United States Patent [19]
Wolfe et al.

[11] Patent Number: 5,435,867
[45] Date of Patent: Jul. 25, 1995

[54] METHOD OF MANUFACTURING A FLEXIBLE TUBULAR STRUCTURE

[75] Inventors: Donald H. Wolfe, 703,12303 Jasper Avenue, Edmonton, Alberta, Canada, T5N3K7; David R. Budney, Edmonton, Canada

[73] Assignee: Donald H. Wolf, Alberta, Canada

[21] Appl. No.: 116,464

[22] Filed: Sep. 3, 1993

Related U.S. Application Data

[62] Division of Ser. No. 669,508, Mar. 14, 1991, Pat. No. 5,261,462.

[51] Int. Cl.⁶ ............................................. B65H 81/00
[52] U.S. Cl. .................... 156/171; 156/175; 156/188; 156/190
[58] Field of Search ............... 156/171, 172, 175, 428, 156/429, 430, 190, 188, 293, 173

[56] References Cited

U.S. PATENT DOCUMENTS

| | | | |
|---|---|---|---|
| 2,393,058 | 1/1946 | Pierce et al. | 57/31 |
| 2,405,909 | 8/1946 | Smith et al. | 156/171 |
| 3,378,426 | 4/1968 | Medney | 156/441 X |
| 3,858,616 | 1/1975 | Thiery et al. | 138/133 |
| 4,588,461 | 5/1986 | Braun | 156/172 X |
| 5,061,338 | 10/1991 | Huvey | 156/425 |

FOREIGN PATENT DOCUMENTS

1316012  5/1973  United Kingdom ............... 156/171

Primary Examiner—Jeff H. Aftergut
Attorney, Agent, or Firm—Weiser & Associates

[57] ABSTRACT

A tubular structure, such as a pipe or pressure vessel, is provided with a wall formed from plastic, composites and elastomeric materials. The composite materials are spirally wound and are separated by elastomeric strips. The wall has an inner wall element formed by a continuous flexible plastic cylinder with a spiral projection on its outer surface. An outer layer is formed from alternating spirally wound strips of composite and elastomer. The composite strip has a radially inward projection axially spaced from the projection on the plastic cylinder but overlapping in the radial direction. The cylinder and layer are separated by an intermediate layer formed from composites and elastomeric strips. A composite strip is located between each pair of adjacent projections and separated from the projections by an elastomeric strip. An outer wall element is formed from alternating spirally wound composite and elastomeric strips having pitch greater than the inner wall element.

19 Claims, 24 Drawing Sheets

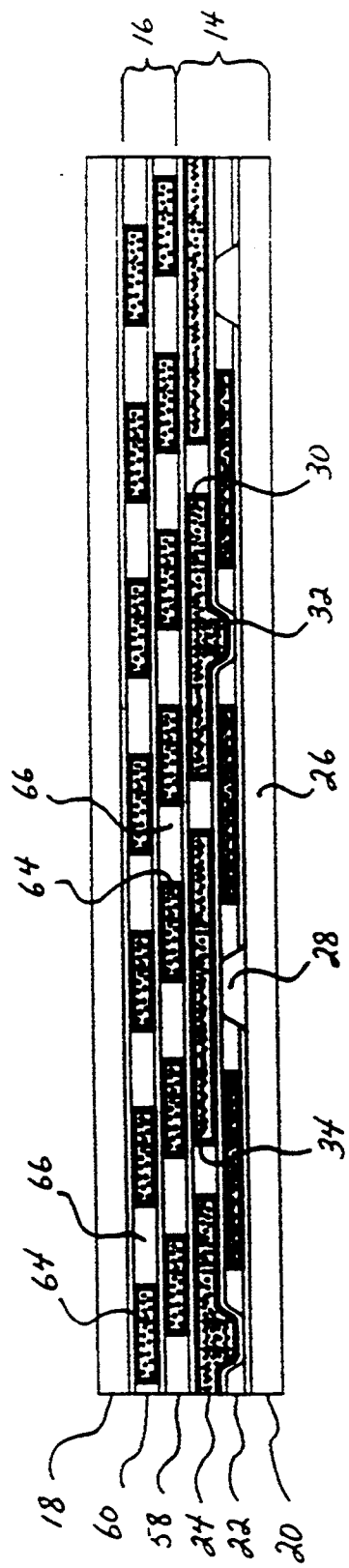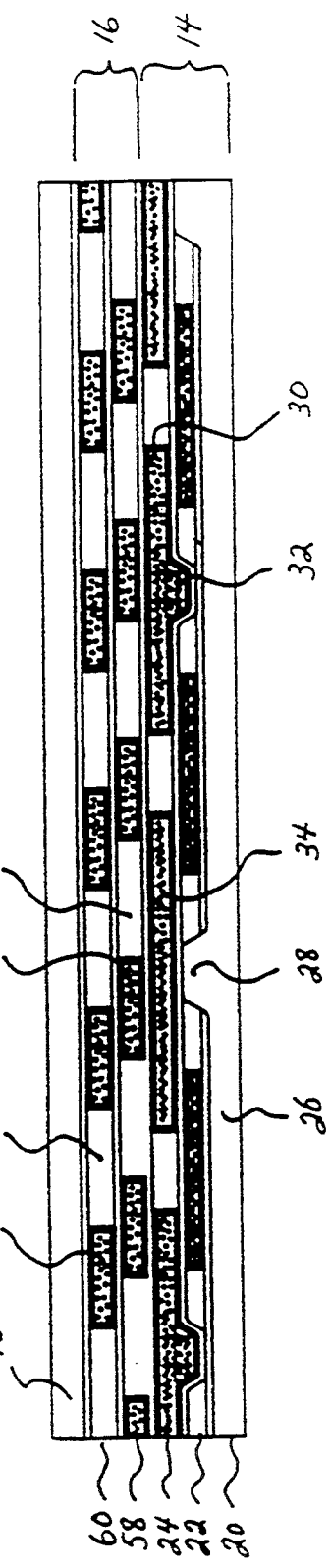

METHOD OF MANUFACTURING A FLEXIBLE TUBULAR STRUCTURE

This is a division of application Ser. No. 07/699,508, filed Mar. 14, 1991, now U.S. Pat. No. 5,261,462.

The present invention relates to tubular structures formed in part by composite materials.

A composite material can be defined as a macroscopic combination of two or more distinct materials having a recognizable interface between them. Composites typically have a discontinuous fibre or particle phase and a continuous matrix phase. The discontinuous phase is stiffer and stronger than the continuous matrix phase and there is generally a 10% or greater volume fraction of the discontinuous phase.

Composites may be divided into classes in various manners. One classification scheme is to separate them according to the form of reinforcement used in the discontinuous phase, i.e. particulate-reinforced, fibre-reinforced, or laminar composites. Fibre-reinforced composites contain reinforcements having lengths much greater than their cross-sectional dimensions. Fibre-reinforced composites can be further divided into those containing discontinuous or continuous fibres. A composite is considered to be a discontinuous fibre or short fibre composite if its properties vary with fibre length. On the other hand, when the length of the fibre is such that any further increase in length does not, for example, further increase the elastic modulus of the composite, the composite is considered to be continuous fibre reinforced. Most continuous fibre reinforced composites contain fibres that are comparable to or greater in length than the overall dimensions of the composite part.

Glass fibre reinforced organic matrix composites are the most familiar and widely used, and have extensive application in industrial, consumer, military and aerospace markets. The glass fibre most commonly used is known as E-glass, a calcium aluminoborosilicate glass having a useful balance of mechanical, chemical, and electrical properties, at moderate cost. Other fibre reinforcement materials include synthetic organic fibres (such as nylon, polyester and aramids) and synthetic inorganic fibres (such as boron, carbon and silicon carbide).

Matrix materials cover the range from polymers to metals to ceramics. Polymers are the most commonly used matrix materials, specifically the organic polyester and vinyl ester resins. The polymers are characterized by low densities, relatively low strengths, a nonlinear stress-strain relationship, and relatively high strains-to-failure. When property requirements justify the additional costs, other matrixes are used, including epoxy, butadiene, bismaleimide, polyimide and other thermosetting resins, and thermoplastic resins. Thermoplastic co-mingled fibre-bundles can also be used.

Composite structures that incorporate continuous, unidirectionally-oriented fibres can be radically anisotropic in nature; that is, they exhibit significantly different properties along different axes. Strength, stiffness, and co-efficient of thermal expansion can vary by more than ten times in different directions. In the fibre direction, loads are carried primarily by the fibres, which determine the mechanical properties in that direction. The fibres deform very little and constrain the matrix to small deformations. On the other hand, the fibres do not contribute significantly in the direction normal to the fibres, so that the matrix acts as a continuous load carrying structure and the fibres move with the deforming matrix, without significantly impeding deformation. Mechanical properties measured transverse to the reinforcement direction will thus be similar to those of non-reinforced matrix materials.

The purpose of the composite matrix is to keep the reinforcing fibres in the proper orientation and position so that they can carry the intended loads, distribute the loads more or less evenly among the fibres, and provide resistance to crack propagation and damage. The mechanical properties of the matrix usually have little effect on the overall strength of the composite, other than from the load transfer characteristics and the strength of the interphase. The matrix generally determines the overall service temperature limitations of the composite, and may also control its environmental resistance.

A tubular structure subjected to free end closure pressure stress, such as a pressure vessel or pressure containing pipeline, can be subjected to internal or external pressure and so requires the tubular wall structure to simultaneously resist longitudinal and circumferential stresses. In addition, a tubular structure may be simultaneously subjected to one or a combination of external direct or shear stresses provided by external pressure, bending, torsional or thermal loading.

In the case of rigid tubular structures employing isotropic materials such as steel or other metals, the structure can simultaneously resist both longitudinal and circumferential stresses with a single wall structure.

Since unidirectional composites typically have exceptional properties in the direction of the reinforcing fibres, but poor to mediocre properties perpendicular (transverse) to the fibres, the approach taken with prior art continuous fibre-reinforced composite tubular structures which may be subjected to more than one-dimensional loading is to combine layers or plies with differing fibre orientations. In this way, the lesser properties perpendicular to the fibre direction are augmented by the superior properties in the direction of the fibre orientation. The adjoining layers of plies are bonded together into a laminate and oriented at different angles with respect to each other such that the effective properties of the laminate match some particular loading condition. Outside loads or stresses applied to a composite tubular structure result in internal stresses which are different in the individual layers. External direct stresses may result not only in internal direct stresses but in internal shear stresses, and external shear stresses may result in internal direct stresses as well as internal shear stresses. Therefore, laminate effective material properties are tailored to meet performance requirements through the use of laminate theory, where the stress-strain relationships for a thin laminated plate are developed for the case of plate membrane forces and bending moments.

Prior art laminated composite tubular structures employ a variety of continuous fibre reinforcement patterns to achieve the required effective laminate properties. These include a pattern which orients the reinforcing fibres at a constant helix angle which resolves the various external forces into a single resultant force in the direction of the fibre. Another pattern utilized where torsional forces are absent combines longitudinal-oriented reinforcing fibres (parallel to the cylinder axis) to resist axial loads together with circumferential-oriented reinforcing fibres (perpendicular to the cylinder axis) to resist hoop loads.

A further pattern combines circumferential-oriented reinforcing fibres to resist a portion of the hoop load, together with helically-oriented reinforcing fibres to resist torsional and axial loads and a portion of the hoop load. A still further pattern of continuous fibre orientation utilized in prior art composite tubular structures combines circumferential-oriented reinforcing fibres to resist a portion of the hoop load, together with helically-oriented reinforcing fibres to resist torsional loads and a portion of both hoop and axial loads, together with longitudinally-oriented reinforcing fibres to resist a portion of the axial load.

Where the structure is intended to be relatively rigid and is not required to exhibit significant flexibility, the laminate may employ appropriate patterns to meet the anticipated loading conditions. However, where a flexible structure is required, additional considerations apply.

The flexural rigidity or bending stiffness of a tubular structure is the measure of its stiffness or resistance to displacement perpendicular to its length as determined by both material elastic properties and cross-sectional dimensions. The flexural rigidity of a tubular structure can be expressed by the radius of curvature (r) resulting from an applied bending moment (M), and is proportional to the modulus of elasticity (E) and moment of inertia (I) as governed by the formula $1/r = M/EI$. The deflection in bending of a tubular structure places one-half of the cylinder wall into compression and one-half into tension, with the neutral axis unchanged in length. Unlike simple axial compression or tension, however, the longitudinal axial stress varies linearly above and below the neutral axis.

Tubular structures are limited in the extent to which they can be deflected perpendicular to their length in bending by the maximum tensile or compressive stress value (whichever causes failure) to which the wall of a cylinder at the furthest point from the neutral axis can be loaded without failure. This relationship can be described by the formula $o\text{-} = Ec/r$, where $o\text{-}=$ longitudinal stress in the cylinder wall at a distance from the cylinder centre line (c), given a radius of curvature (r). The longitudinal stress generated in the wall of a cylinder deflected in bending is thus inversely proportional to the radius of curvature and directly proportional to the distance from the centre line of the cylinder. Greater curvature (smaller radius) increases axial stress in the cylinder wall and the maximum stress is experienced at the perimeter of the cylinder at the furthest distance from its neutral axis. The flexural strength of a tubular structure is generally referred to as the maximum stress that can be borne by a surface element of a cylinder in bending without failure.

For composite tubular structures, the fundamental principles governing bending are the same. However, there are some additional factors. For composite tubular structures comprising continuous fibre-reinforced laminate plys oriented at various directions relative to each other, the maximum bending stress does not necessarily occur at the outermost perimeter of the cylinder as it does with isotropic materials. Due to the differing directional orientation of the fibre reinforcement, each laminate layer is likely to have a different strength and stiffness when measured in the direction of the cylinder axis. When a bending moment is applied to the composite tubular structure, a longitudinal stress is produced in each of the laminate plies proportional to the elastic modulus of that layer and its distance from the neutral axis. The maximum bending stress in each layer is experienced at the radially outer edge of each laminate ply. This longitudinal stress generated in each laminate ply is resisted by the longitudinal strength of each laminate, with failure occurring in the individual laminate ply with the lowest ultimate strength (within its elastic limit) relative to the induced bending stress. Therefore, although the laminate construction of composite tubular structures creates a potentially different point of failure in bending other than at the outermost perimeter of the cylinder, the maximum bending deflection of prior art composite tubular structures is limited to the maximum longitudinal stress that can be borne by the earliest failing laminate ply.

The anisotropic nature of continuous fibre reinforced composites places a severe limitation on the ability to increase the maximum bending deflection of prior art composite tubular structures. Laminate plys containing fibre-reinforcements oriented parallel to the bending stress will exhibit the highest ultimate strength, but also the highest elastic modulus. Fibres oriented transverse to the bending stress will exhibit the lowest elastic modulus, but also the lowest ultimate strength.

Given the high levels of strength and predictability of continuous fibre reinforced composite structures in axial tension, that portion of the prior art cylinder wall which is placed in tension is unlikely to experience failure prior to the portion of the cylinder wall placed in compression. The compressed portion behaves far less predictably. Axial compression of continuous fibre reinforced composite structures produces shear components of load between the fibre and matrix. These out-of-plane components can lead to tension loads in the matrix that may cause premature matrix failure. The results of analysis of composites indicate a significant variability in axial compressive strength as it is essentially a matrix-dominated variable. Therefore, prior art composite tubular structures exhibit minimal capacity for axial deflection without failure due to limited and significantly variable maximum compressive stress values which renders them unsuitable for flexible tubular structures.

A further problem associated with prior art composite tubular structures is that due to the low elastic modulus of glass-reinforced composite materials in contrast to steel, such structures exhibit significant axial expansion when subjected to internal pressure stress. In restrained end closure pressure-containing pipelines, this characteristic places all or a portion of the pipeline structure into compression and can impose large and potentially damaging loads on fittings such as elbows, and on terminal equipment such as valves and pumps. As composite materials exhibit limited and highly variable maximum compressive stress values, and this magnitude of axial expansion cannot in practice be accomodated with conventional steel expansion devices, significant limitations are placed on the performance of prior art composite tubular structures when used as pressure vessels or pressure-containing pipelines.

To provide a flexible tubular structure, various arrangements have been proposed in which the wall of the structure is formed from several different components. In the case of flexible tubular structures employing isotropic materials such as steel and other metals, there is a significant reduction in structural efficiency in contrast to rigid tubular structures since the designer must provide a structural wall or layer to resist each of the longitudinal and circumferential forces. One structural wall or layer must be oriented so as to predominantly resist circumferential forces while concurrently having the capacity to spread itself axially to permit bending, thus having little or no resistance to longitudinal forces. A second wall or layer must be oriented so as to predominantly resist longitudinal forces while concurrently having the capacity to spread itself axially to permit bending, thus having little or no resistance to circumferential forces. Both independent layers are designed to perform their specialized function by the use of narrow, helically-oriented strips, which in both cases are stressed predominantly along the strip length with little or no stress induced across the width of the narrow strip. For this reason, isotropic materials such as steel and other metals are inefficient materials for such flexible structures, since the strength of the material in the direction transverse to the strip length is underutilized and thus wasted in resisting stresses placed on the tubular structure.

Typically prior art steel flexible tubular structures utilize a mechanism of helically-oriented interlocking metal strips which serve to limit the maximum axial strain in flexure at any point along the length of the cylinder. This mechanism is provided by forming a "U" or "Z" shaped profile and subsequently post forming it into a the helically-oriented steel strip in such a manner as to provide interlocking of the strip as it is formed around the pipe. In flexure, this interlocking mechanism restricts the gap between adjacent strips to a maximum specified dimension, thus providing a defined containment net through which the internal plastic liner or bladder will not extrude.

However, as noted above, isotropic materials such as steel and other metals are inefficient materials for such flexible structures, since the strength of the material in the direction transverse to the strip length is underutilized and thus wasted in resisting stresses placed on the tubular structure.

Although composites are recognized as anisotropic and should therefore be more efficient than isotropic material in such structures, interlocking mechanisms such as those used for steel structures are not practical with flexible tubular structures which employ continuous fibre-reinforced composite materials. Although a linear, "U" or "Z" shaped fibre reinforced composite part can be fabricated using the process of pultrusion, this process is not practical for the production of helically-oriented components as used in the steel structures because such part cannot be post formed.

It is therefore an object of this invention to provide a flexible tubular structure which permits the use of fibre reinforced composites as a structural component.

In general terms, the present invention provides a tubular structure having a circumferential wall formed from a pair of juxtaposed wall elements. One of the wall elements comprises a plurality of juxtaposed layers, one of which is continuous and flexible and has a spirally wound radial projection directed toward another of the layers. The other layer includes a first spirally wound composite strip having a radial projection directed toward the one layer. The other layer further includes a spirally wound elastomeric strip interposed between adjacent passes of the composite strip. The projections on the one layer and the other layer are staggered relative to one another in an axial direction and overlap one another in the radial direction. The layers are separated by an intermediate layer having a spirally wound composite strip located between each pair of projections and flanked by spirally wound elastomeric strips so as to locate an elastomeric strip between a composite strip of said intermediate layer and an adjacent one of said projections. The composite strips of the layers overlap one another in the axial direction to provide a continuous composite barrier in the one wall element in the radial direction. The other wall element comprises a layer of alternating spirally wound composite strips and elastomeric strips. The pitch of the spirally wound composite strips in the radially outer of the wall elements is greater than the pitch of the composite strips in the radially inner of the wall elements. The elastomeric strips in each wall element uniformly distribute the composite strips in the respective wall element upon flexure of the tubular structure to maintain the structural integrity thereof.

In bending, the three layers which comprise the one wall element act to permit and facilitate realignment of the composite strips in a manner which seeks to minimize the stresses induced in such structural components and which attempts to maintain a maximum uniform strain throughout the cylinder length by limiting the maximum axial distance which any two adjacent spirally wound strips can separate from one another. Bending stiffness of the cylinder is largely determined by the radial thickness and elastic modulus of the continuous flexible layer. The intermediate and other layer of the one wall element provide the primary resistance to hoop tensile stresses derived from internal pressure, and resistance to hoop compressive stresses derived from axial loading and external pressure. In flexure, the deformation of elastomeric material between adjacent spirally wound composite strips permits a shortening of that half of the wall element placed in compression, by the transfer of a portion of the elastomeric material to the opposite half of the wall element placed in tension.

The other wall element provides resistance to longitudinal tensile stresses derived from internal pressure, torsional and axial loading, and resistance to compressive stresses derived from external pressure. When subjected to a bending force, the portions of the wall elements which are placed in compression achieve a shortening in their longitudinal axes by a reduction in the distance between adjacent composite strips. The portions of the wall element which are placed in tension achieve a lengthening in their longitudinal axis by an increase in the distance between adjacent composite strips. For any given cylinder length in flexure, the increase in area above the neutral axis is equal to the reduction in area below the neutral axis. In flexure, a portion of the elastomeric material in the reduced area between adjacent composite strips in the half of the cylinder that is shortened axially by compression is redistributed to the increased area between adjacent composite strips in the half of the cylinder in tension. In this fashion, minimal bending stress is induced in the fibre-reinforced composite strips but rather the flexure is made possible by a change in their geometry and the deformation of elastomeric material.

The tubular structure of the preferred embodiments minimizes the reliance upon the limited and significantly variable maximum compressive stress value to permit a smaller radius of curvature to be obtained.

A tubular composite structure which may be subjected to internal or external pressure, thermal or torsional stress, or a combination of these loading conditions must be designed such that the ultimate strength of the laminate is sufficient to resist the combined total of all stresses, including bending stress, without failure. Therefore, the applied stress on a cylinder in flexure must be added to the applied stress from other loading conditions in determining required laminate orientation and thickness. In the preferred embodiment, because the structural components of the tubular structure, namely the spirally wound composite strips, are not significantly stressed in flexure, the laminate thickness is determined principally by the other loading conditions.

Embodiments of the present invention will now be described with reference to the accompanying drawings in which:

FIG. 3B is a view similar to FIG. 3A taken on the line 3B—3B;

FIG. 3C is a view similar to FIG. 3A taken on the line 3C—3C;

Figure 1:
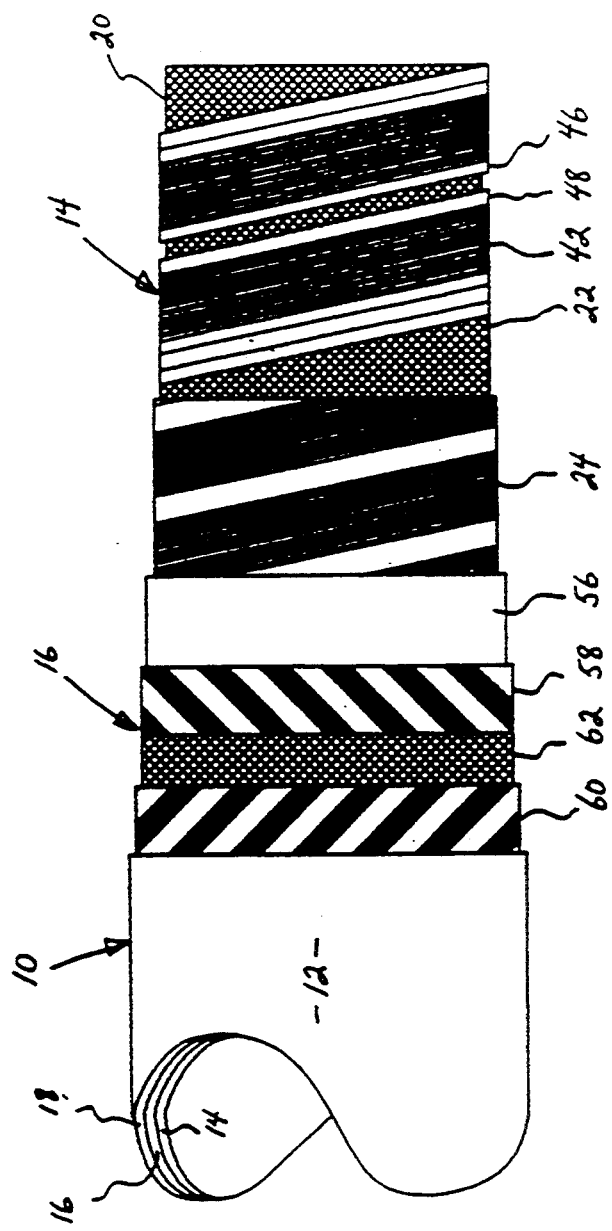
FIG. 1 is a general side view of a tubular structure with layers thereof progressively removed.

Referring therefore to FIG. 1, a tubular structure 10 has a circumferential wall 12 that is formed from a pair of juxtaposed wall elements 14,16. An outer sheath 18 completes the wall 12 and provides protection from the environment for the elements 14,16.

Figure 3A:
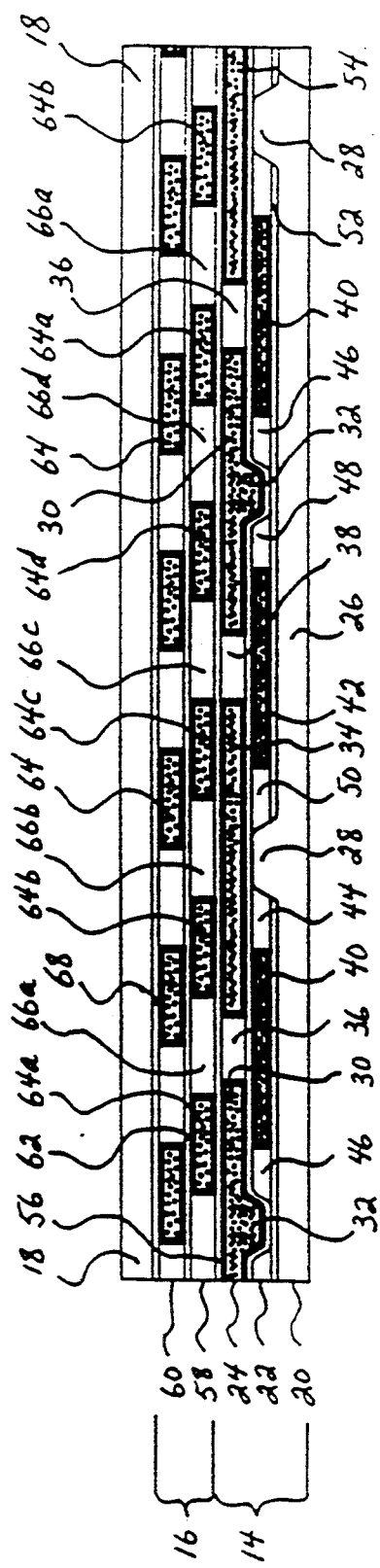
FIG. 3A is a sectional view of FIG. 2 on the neutral axis as indicated by section line 3A—3A.

As can best be seen in FIG. 3A, the radially inner wall element 14 comprises three separate layers, namely 20, 22 and 24. The inner layer 20 consists of a continuous flexible plastic cylinder 26 having a spirally wound protrusion 28 projecting radially outwardly therefrom. The layer 20 can typically be formed from a thermoplastic polymer or elastomeric material and is preferably impermeable to the fluids to which it may be exposed. In certain cases, layer 20 may include an inner liner (not shown) of impermeable material so that the cylinder 26 may be formed from a material having different properties.

outer layer 24 consists of a spirally wound composite strip 30 having a radially inward projection 32 directed towards the inner layer 20. The composite strip 30 has the same pitch and hand as the spiral projections 28. However, the projections 32 and 28 are staggered axially and overlap in the radial direction. A second spirally wound composite strip 34 is located between the successive passes of the strip 30 and located axially so as to be aligned with the projection 28. Composites strips 30,34 each consist of a bundle of fibres or roving, for example E-glass, generally orientated in the direction of the winding with a matrix disbursed between the fibres. The fibres in the roving may be contained by transverse fibres extending about the roving to provide a smooth exterior surface and resist torsional loads in the strip induced in bending of the structure. The matrix may, for example, be polyester. Typically, the composite strips will have 75% by weight of fibre and 25% by weight of matrix although, as will be discussed more fully below, alternative materials and ratios may be used.

Located between the composite strips 30,34 are a pair of spirally wound elastomeric strips 36,38. These strips may be any suitable elastomer such as neoprene. Strips 36 and 38 are located on opposite flanks of the composite strip 30 and act to maintain the composite strips 30 and 34 in spaced relationship.

An intermediate layer 22 is located between the layers 20,24 and consists of a pair of composite spirally wound strips 40,42. Each of these strips 40,42 is of the same hand and same pitch as the strips 30 and 34 and is axially located so as to overlap in the axial direction each of the adjacent strips 30,34 in the outer layer 24. Each of the strips 40 and 42 is located between adjacent ones of the projections 32,28. A pair of elastomeric strips 44,46 and 48,50 is associated with the composite strips 40 and 42 respectively and located on opposites sides thereof. Strip 44 is thus interposed between the composite strip 40 and the projection 28 and elastomeric strip 46 is interposed between the strip 40 and projection 32. Similarly, the elastomeric strips 48 and 50 are interposed between the composite strip 42 and the projection 32 and 28 respectively.

A layer of friction-reducing material such as polyethylene film 52 is located between the inner layer 20 and intermediate layer 22. Similarly, a layer of friction reducing material 54 is applied between the outer layer 24 and intermediate layer 22 so as to minimize the resistance to relative axial movement between the layers 22 and 24.

Outer wall element 16 is separated from the inner wall element 14 by a friction-reducing film 56. The outer wall element 16 consists of inner and outer layers 58,60 which in turn are separated by a friction-reducing film 62. Each of the layers 58 and 60 consists of alternating composite strips 64 and elastomeric strips 66 that are spirally wound. The pitch between successive passes of each strip 64 is greater than that of the composite strips of the inner wall element 14 so that in general there will be a greater number of individual strips 64 than there are strips 30,34. For added clarity, each separate strip 64 has been denoted with a suffix a, b in FIG. 3A with the corresponding elastomeric strip 66 also denoted with suffixes a, b and c. The pitch of the strips 64,66 in outer layer 60 is the same as that of the inner layers 58 but is of opposite hand as can be seen in FIG. 1.

A friction-reducing film 68 is located between the outer sheath 18 and the layer 60 to minimize resistance to relative movement between the sheath and outer layer 60.

In operation, the principal bending stiffness of the structure 10 is determined by the flexible layer 20. The composite strips of the outer layer 24 and intermediate layer 22 of wall element 14 essentially constitute helical springs formed from composite material and do not contribute significantly to the bending stiffness of the overall structure. The overlapping of the composite strips of the intermediate layer 22 and outer layer 24 provides a continuous barrier of composite material in a radial direction in the wall element 14 and thereby supports the layer 20 against internal pressure to inhibit extrusion of the layer 20 through the wall element 14. The elastomeric strips act to maintain the composite strips uniformly distributed along the axial length of the tubular structure and interact with the projections 28 and 32 to maintain the composite strips 40,42 of the intermediate layer centred between the composite strips 30,34 of the outer layer 24. As can be seen from FIGS. 3B and 3C, as the tubular structure is flexed transverse to its longitudinal axis, the composite strips on one side of the neutral axis move apart and the composite strips on the other side of the neutral axis move together. This is accomodated by a bodily displacement of the elastomeric strips which however maintain a uniform loading across the composite strip to maintain them uniformly distributed and maintain the continuous composite barrier in the radial direction.

In flexure, the behaviour of each of the components contained within the layers is governed by the behaviour of the components which have greater bending stiffness. In flexure, that component which has the greatest bending stiffness will first seek its modified shape tend to force the component with the next greatest bending stiffness to comply with its movement. The component with the second greatest bending stiffness will seek its modified shape, within the limitations provided by the component with the greatest bending stiffness, and tend to force the component with the third greatest bending stiffness to comply with its movement. By modifying the dimensions and elastic moduli of the composite, plastic and elastomeric components which make up the layers, it is possible to govern the behaviour of each of the components in flexure. For a tubular structure with an inside diameter of 3" and a helix angle of 70 degrees, the following component dimensions and elastic moduli provide the following respective bending stiffnesses for each of the components:

| Component | Reference Number | Radial Thickness | Axial Width | Elastic Modules | Banding Stiffness |
|---|---|---|---|---|---|
| Plastics Cylinder | 26 | .200 in. | continuous | 36,000 psi | 83,000 lb. in$^2$ |
| Elastomer Strips | 36, 38, 44, 46, 48, 50 | .050 in. | .250 in. | 500 psi | 3,000 lb. in$^2$ |
| Composite Strips | 30, 34, 40, 42 | .050 in. | 1.125 in. | 3.5 million psi | 110 lb. in$^2$ |

In the above example, the plastic cylinder 26 will dictate the behaviour of the remaining components by virtue of its significantly greater bending stiffness relative to the other components. The spirally wound elastomer strips, by virtue of their next highest bending stiffness, will modify their shape within the limitations defined by the plastic cylindrical component and in turn cause the composite strips, with the lowest relative bending stiffness, to conform. By reliably controlling the behaviour of the components in this manner, and by virtue of the minimal bending stiffness of the structural composite components, the tubular structure can be deflected in bending to a radius of curvature 10 times its diameter without subjecting the composite structural components to significant bending stresses. In flexure, the half of the inner wall element which is placed in tension achieves a lengthening in its longitudinal axis by an increase in the axial distance between the protrusions extending from the inner plastic cylinder. The opposite half of such inner wall element which is placed in compression achieves a shortening in its longitudinal axis by a reduction in the distance between the protrusions extending from the inner plastic cylinder. This adjustment in spacing between protrusions of the high bending stiffness plastic cylinder forces the deformation of elastomeric material from the reduced area in the half of the cylinder shortened axially in compression, to the increased area in the half of the cylinder lengthened axially in tension. This deformation of elastomeric material from one half of the tubular structure to the other causes a realignment of the spirally wound composite strips which have the lowest bending stiffness. In flexure, the protrusions 28 and 32 co-operate with the elastomeric strips of the intermediate layer 22 to ensure that the composite elements remain overlapped and a continuous wall of composite material is provided.

The provision of the films 52, 54, 56, 62 and 68 avoids direct contact between the layers and therefore facilitates relative movement between the elements of the layers during bending.

The principle function of the outer wall element 16 is to resist axial loads. As the helix angle of the strips 64 decreases, i.e. as the pitch increases, so the axial strength of the structure increases.

The relative radial thicknesses of the composite strips 30,34, and 40,42,64 and the relative pitches of each of the wall elements determines the maximum loading capability available for a given structure. As may be seen from Table I appended to the description, the parameters are to a certain extent interdependent but can be adjusted to accomodate a wide variety of operating conditions.

As can be seen from Row A of Table I, as the maximum internal pressure is increased, the radial thickness of each of the layers 22, 24 and 58,60 similarly increases in a generally linear manner. It will be noted, however, that the bending stiffness remains substantially the same, indicating, as noted above, that the bending stiffness is determined essentially by the cylinder 26.

Row B of Table I illustrates the effect of varying the helix angle in the outer wall element 16. As might be expected, as the helix angle increases to 50° from 40° (pitch decreases), the axial strength is significantly affected and a large increase in the thickness of the layers 58,60 is necessary. A small reduction in the thickness of the layers 22,24 also results but not enough to offset the increase in elements 58,60.

Row C shows how varying the helix angle of the components of wall element 14 does not significantly affect bending stiffness but requires a large increase in radial thickness to maintain the maximum internal pressure rating for a change from 70° to 60° : There is a corresponding decrease in the thickness of layers 58,60 but this is reflected in the decrease in axial strength.

Rows D & E show clearly how the helix angles of the composite strips in wall element 14,16 have optimum values for maintaining a maximum internal pressure rating.

In the above examples, the elastomeric strips will have an axial width of 0.25 in. and the composite strips a width of 1.25 in.

By way of comparison, Table 2 below shows the configuration of components in a three-inch diameter pipe and a six-inch diameter pipe intended to withstand the same maximum internal pressure, namely 5,000 p.s.i.

| Diameter (in.) | Thickness Layer 20 (in.) | Thickness Layers 22, 24 (in.) | Helix Angle (°) | % Composite (%) | Thickness Layers 58, 60 (in.) | Helix Angle (°) | % Composite (%) | Wall Element 18 (in.) | Axial Strength (lbs.) | Bending Stiffness (lb. in$^2$) |
|---|---|---|---|---|---|---|---|---|---|---|
| 3.0 | .2 | 0.16 | 70 | 75 | 0.21 | 40 | 49 | 0.50 | 20,000 | 96,581 |
| 6.0 | .2 | 0.033 | 70 | 75 | 0.43 | 40 | 49 | 0.50 | 83,000 | 792,108 |

Thus, a doubling of wall thickness is required but a significant fourfold increase in axial strength is obtained. The large increase in bending stiffness is attributable mainly to increased diameter of the cylinder 26.

Figure 2:
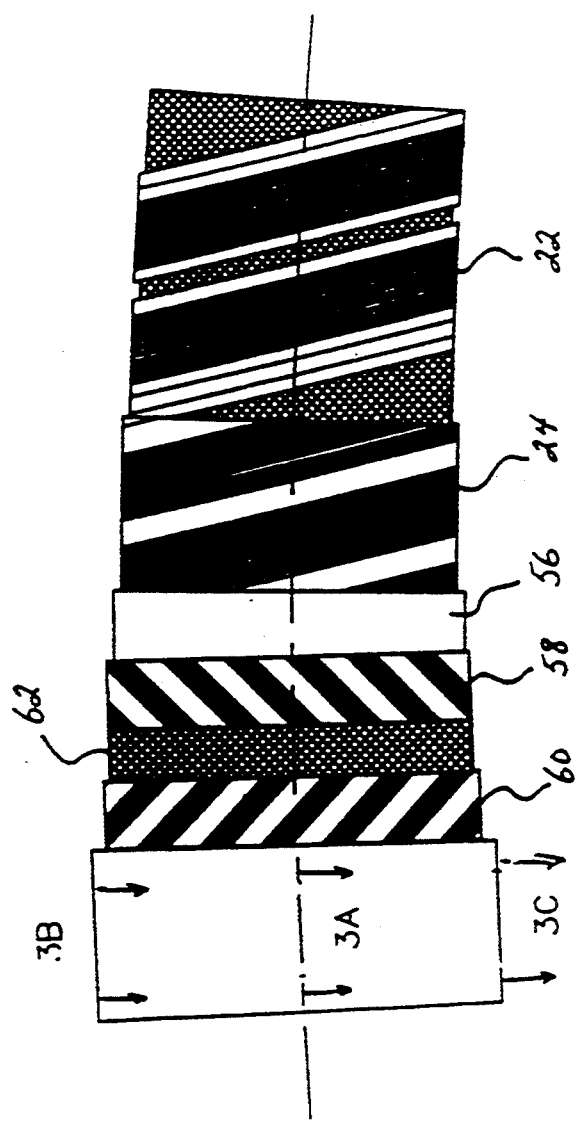
FIG. 2 is a side elevation of the structure shown in FIG. 1.

The arrangement shown in FIGS. 1, 2 and 3A illustrates relatively simple wall structures suitable for use in a wide variety of applications. Where a pipe is to be used in an environment requiring a high level of integrity, the wall element 14 may be replicated so that the wall element 16 is located between a pair of wall elements each similar to wall element 14. This provides a degree of redundancy for the containment of the layer 20 should a failure occur in element 14. This arrangement is shown in FIG. 4 where like reference numerals will be used to denote like elements with a prefix "1" added for clarity.

Figure 4:
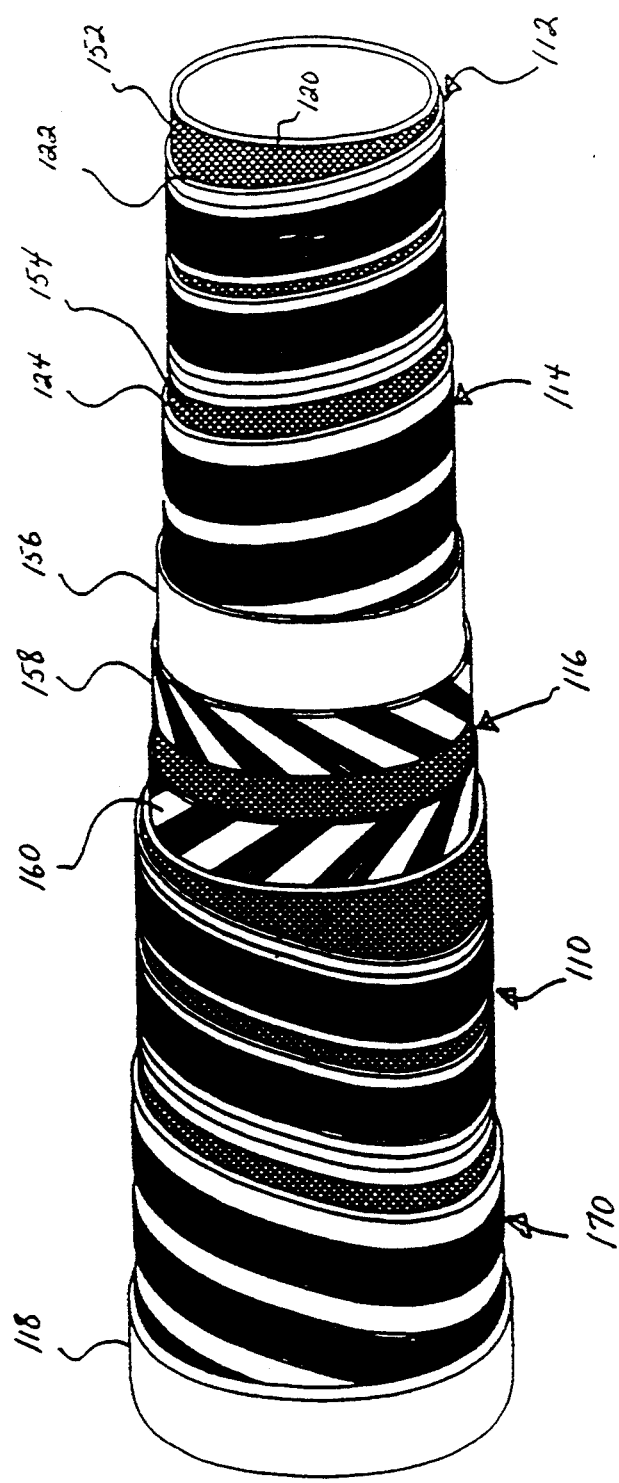
FIG. 4 is a general perspective view of a further embodiment of tubular Structure.

As can be seen from FIG. 4, a radially inner wall element 114 having layers 120, 122, 124 as described above as with respect to FIGS. 1 and 2 is encompassed by a wall element 116 formed from layers 158 and 160. A further wall element 170 is located radially outwardly of the wall element 116 and is similar in construction to the wall element 114. However, the hand of the spiral composite and elastomeric strips in the wall element 170 is opposite to that of the wall element 114, although the pitch is similar. A sheath 118 completes the wall structure. The wall element 170 provides further resistance to hoop tensile stresses derived from internal pressure, resistance to hoop compressive stresses derived from longitudinal tensile loading and external pressure and resistance to external impact or handling damage.

The arrangement shown in FIG. 4 has the advantage that there is a neutral torque loading due to axial loads and internal pressure when using the pair of similar but opposite hand wall elements 114,170. This reduces flexing of the wall and of course torque loads that may be imposed upon couplings at opposite ends of the tubular structure. The wall element 170 may also be used to adjust the density of the tubular structure to a desired value.

It will be appreciated that the above configurations are exemplary only and additional wall element thicknesses or alternative wall element pitch can be designed to meet a particular set of loading conditions. The relative thickness and disposition of the various layers may be optimized to meet those parameters while maintaining the basic structural elements shown in the drawings.

The above description has referred generically to a plastics material for layer 20, and composite strips and elastomeric strips in the wall elements 14 and 16. It will, however, be appreciated that a wide variety of materials are suitable to form the individual elements that may be chosen to suit particular applications. For example, the plastic layer may be a thermoset or thermoplastic polymer, such as polyethylene, polybutylene, polypropylene, polyurethane, fluoroplastics, polyamides or polyamide-imides.

Similarly, the composite strip may be formed from any suitable fibre interspersed with a suitable matrix. Typical of such fibres are glass fibre, nylon, polyester, aramid, boron, carbon and silicon carbide. Typical of such matrix materials are polyester, vinyl ester and epoxy. The individual characteristics and preferences for the use of each material are well known within the composites art and therefore need not be elaborated further.

Elastomeric materials may also be selected from a wide range of available materials. Elastomeric materials include natural and synthetic thermoset rubbers and thermoplastic elastomers. Synthetic rubbers include nitrile rubber, EPDM, butyl rubber, silicone rubber and a variety of specialized blends designed for specific service conditions. Thermoplastic elastomers include styrenic block copolymers, polyolefin blends, elastomeric alloys, thermoplastic polyurethanes, thermoplastic copolyesters, and thermoplastic polyamides.

The manner of manufacturing the tubular structure 10 is shown more fully in FIGS. 5 through 14. It will be appreciated in these Figures that the components of the manufacturing apparatus are individually well known although their combination to produce the process described below and the tubular structure described above is believed to be novel. The process will be described to produce the tubular structure shown in FIGS. 1 and 2 and similar reference numerals will used for the same components.

Figure 5:
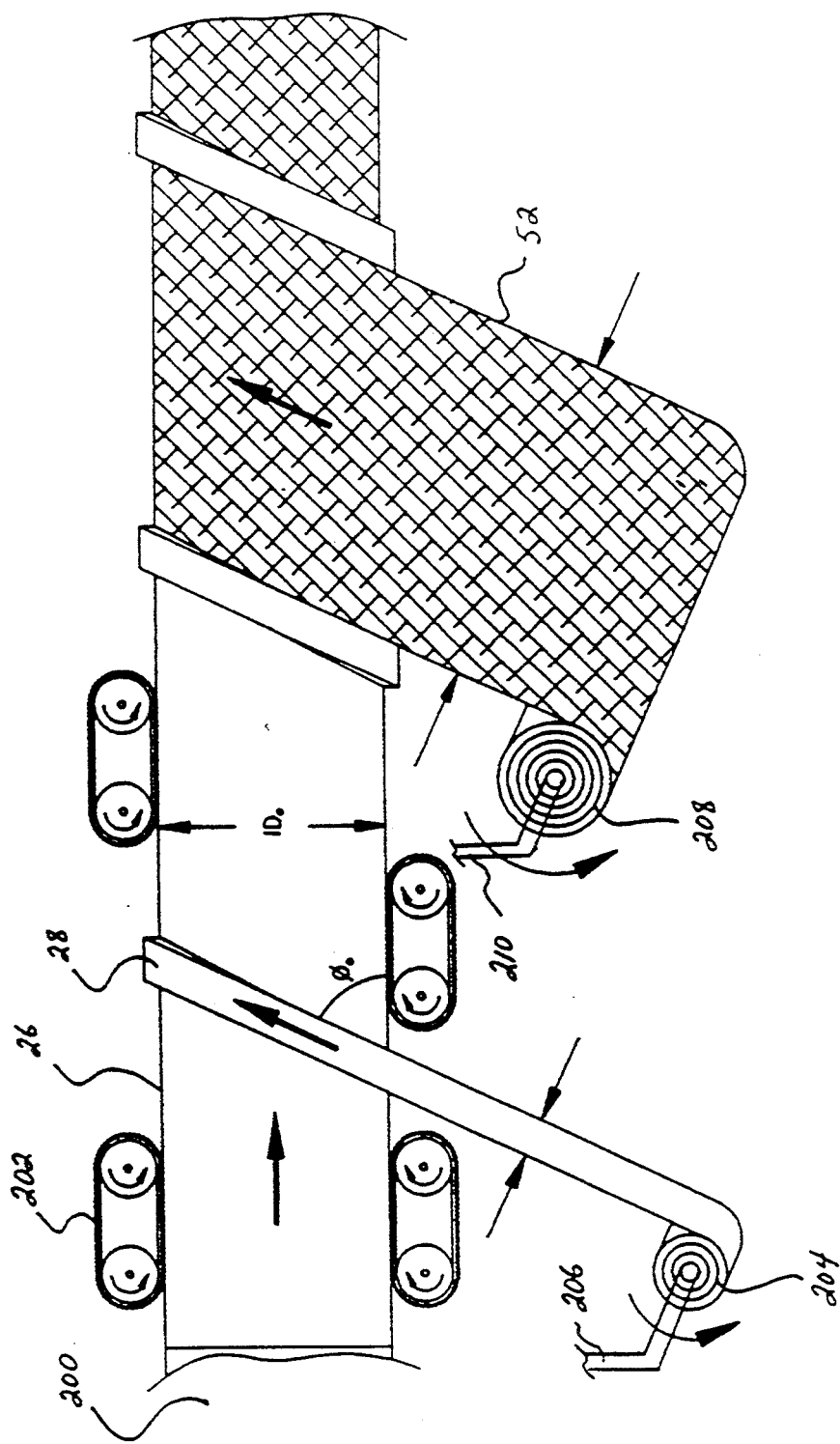
FIGS. 5–14 are schematic representations of successive stages in the manufacture of the structure shown in FIG. 1.

Referring therefore to FIG. 5, the tubular wall 26 of intermediate layer 20 is extruded from a die 200 and moved axially by means of gripper wheels 202. The radial projection 28 is formed on the outer surface of the wall 26 by an elongate strip of similar material that is welded or bonded to the outer surface of the wall 26 as it is applied. A coil 204 of the strip 28 is mounted on a spider 206 that is rotated about the axis of movement of the wall 26 as it is moved axially. Accordingly, the strip is laid down as a continuous spiral protrusion with the requisite pitch.

A layer of film 52 is then applied between the projections 28 from a roll 208 that is mounted on a spider 210 and rotated about the axis of movement. The protrusions 28 serve as a guide for the film 52 so that it is neatly and uniformly laid down on the surface of the element 26 between the projections 28.

Figure 6:
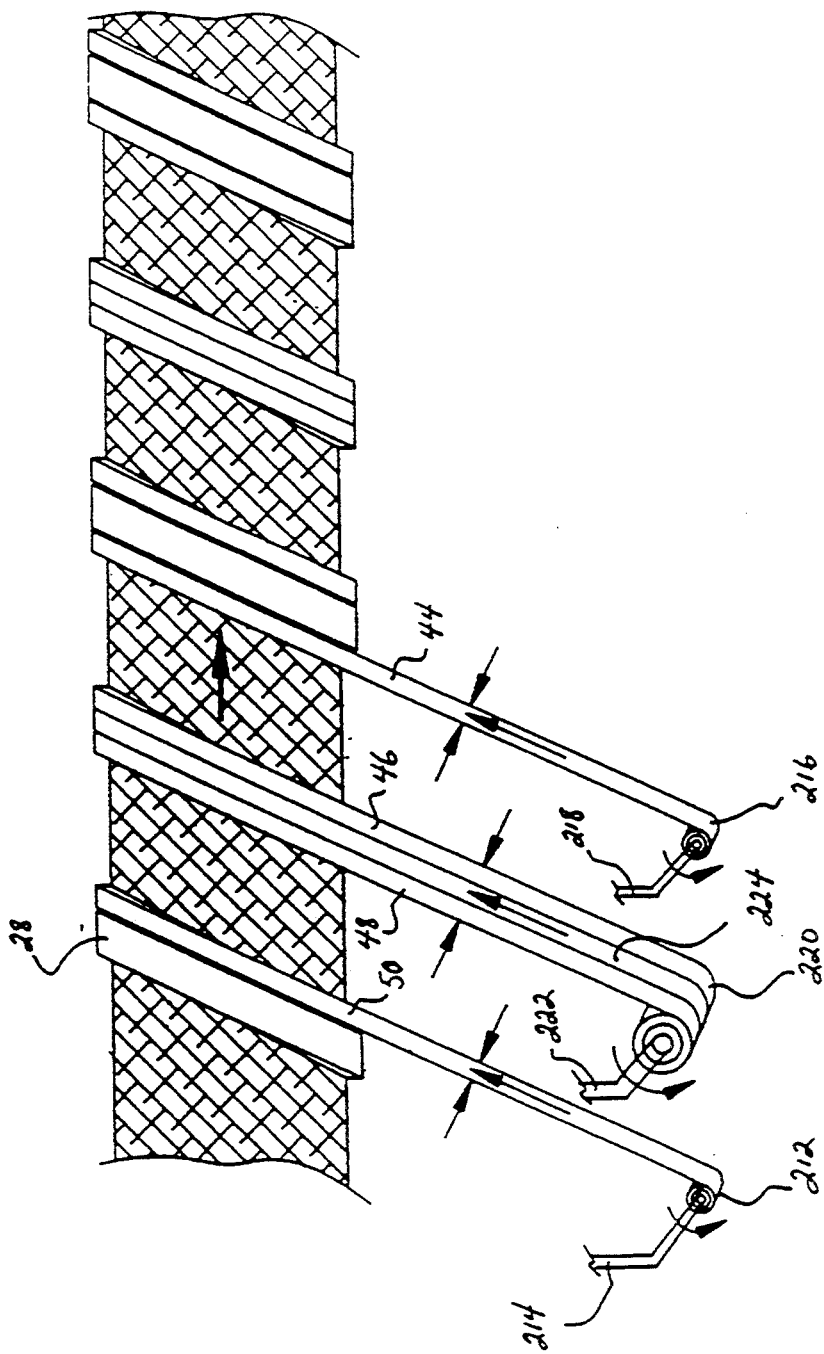

Referring to FIG. 6, the elastomeric strips 50 are then applied from a coil 212 mounted on a spider 214 and abut the projection 28 that serves as a guide for the strips 50. A slight tension is applied to the elastomeric strip 50 so that it grips the outside of the wall 26. The elastomeric strip 44 to the opposite side of projection 28 is similarly applied in an axially spaced location from a roll 216 that is rotated on a spider 218.

The strips 46 and 48 are applied between the projections 28 from a roll 220 rotated about the axis of the tubular structure by means of a spider 222. As can be seen from FIG. 6, an additional strip 224 is applied between the strips 46,48 to maintain them in spaced relationship. Again, a slight tension is applied to the elastomeric strips to maintain them in place during formation.

Figure 7:
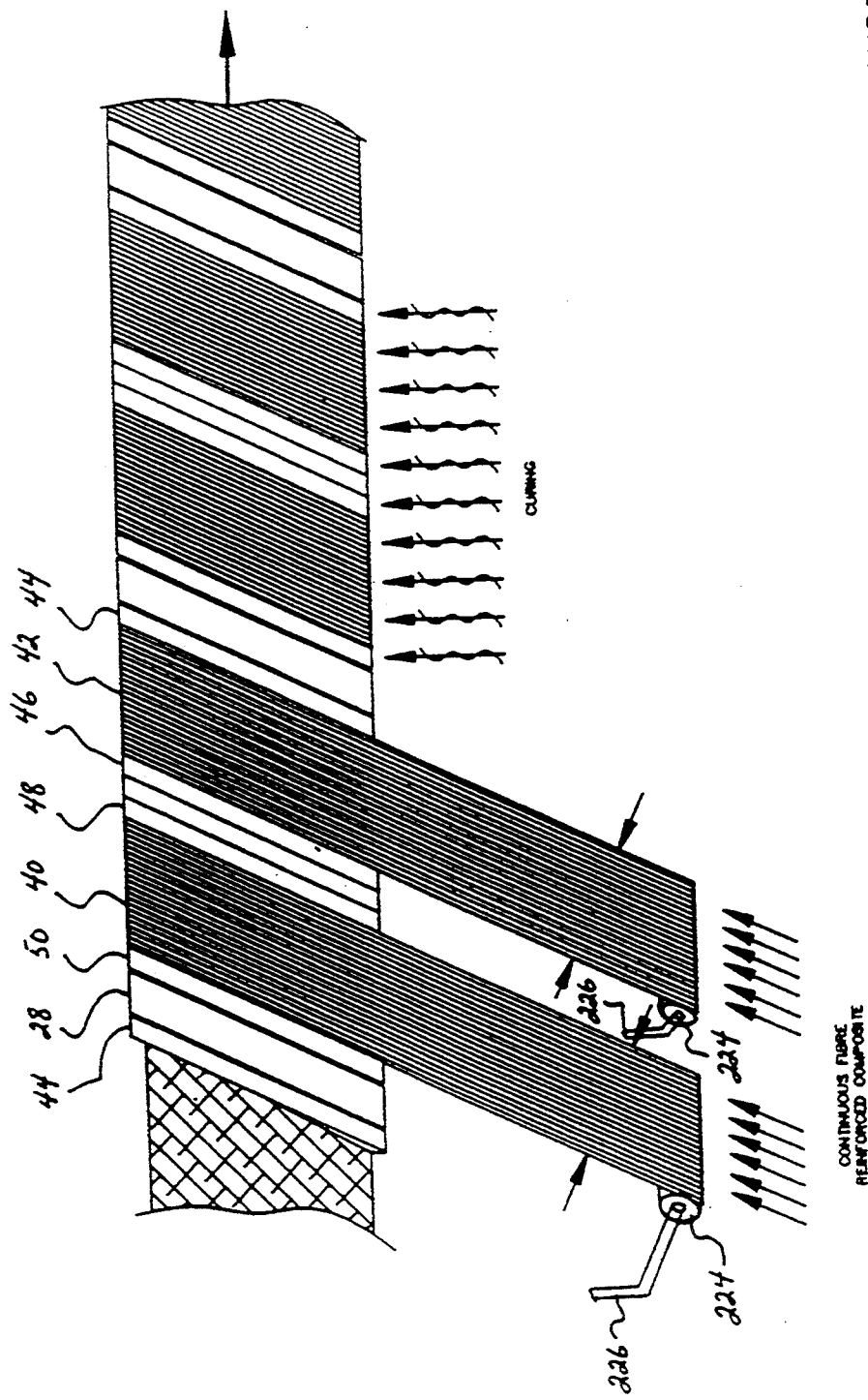

As can be seen in FIG. 7, the composite material forming the strips 40 is then applied in a similar manner from coils of fibre 224 rotated on a spider 226. Although shown schematically as a single coil, it will be appreciated that the fibre may be supplied from a number of separate coils rotated in union about the axis of the structure. The matrix material may be applied to the fibre as it is unwound from the coil 224 or alternatively, pre-impregnated fibres or thermoplastic co-mingled fibres could be utilized to provide the matrix material. The previously applied elastomeric strips 44,46,48 and 50 serve as a mould for the composite 40,42 allowing it to be applied in a continuous manner to the tubular structure prior to curing. After application, the composite material is cured by suitable curing techniques such as infrared or heat. At this stage, the inner layer 20 and intermediate layer 22 has been completed.

Figure 8:
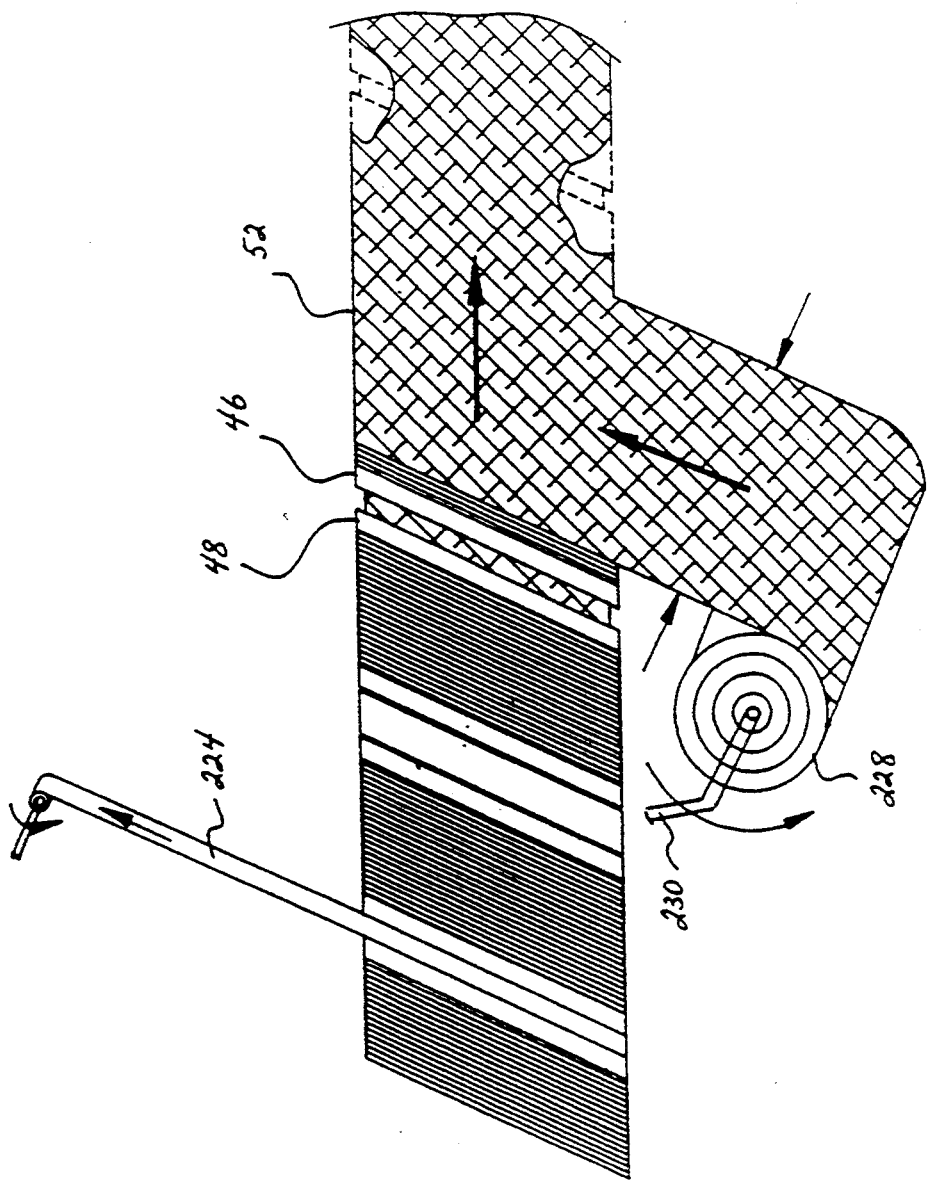

In order to produce the outer layer 24, it is necessary to provide a mould for the projection 32 of the composite strip 30. This is provided by removal of the strip 224 that was applied between the strips 46 and 48. Once the strip 224 is removed, a spiral recess is formed on the outer surface of the tubular structure which will accomodate the projection 32. The film 54 is then applied to the outer surface of the tubular structure from a coil 228 mounted on a spider 230 rotating about the axis of the structure. This is shown in FIG. 8.

Figure 9:
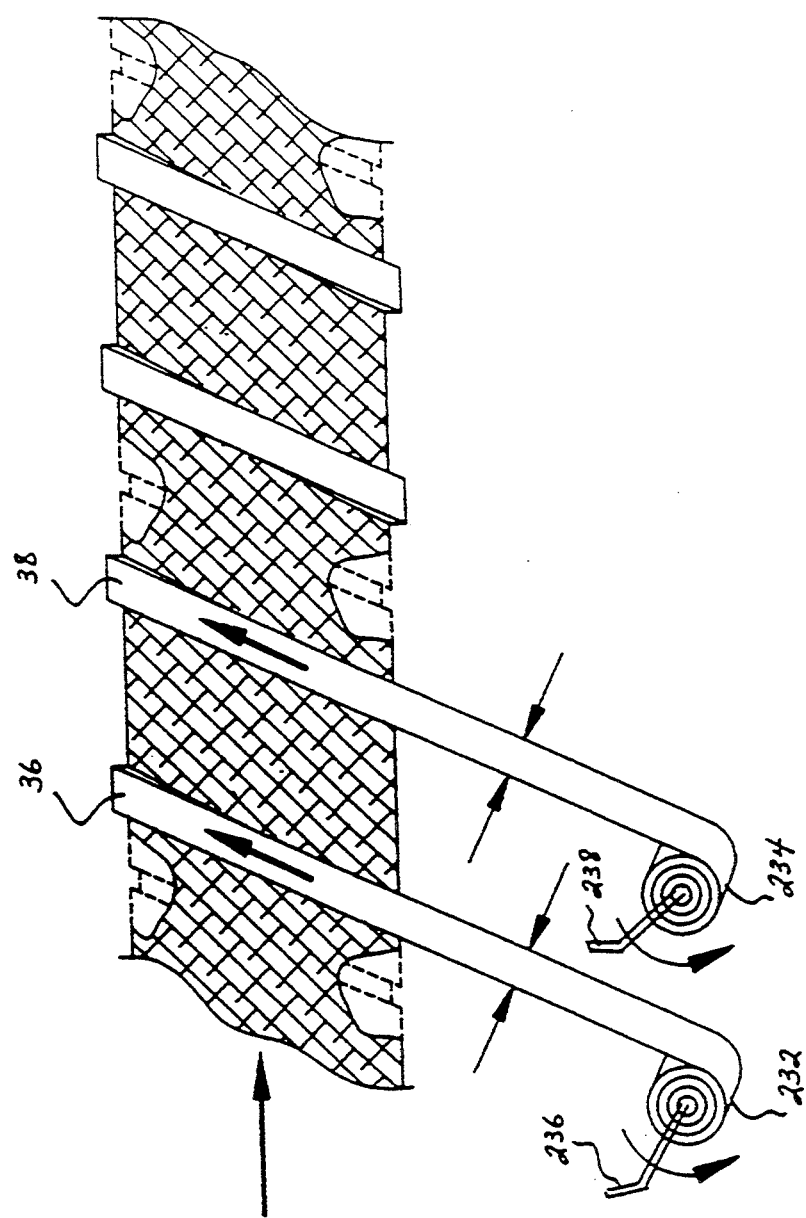
Figure 10:
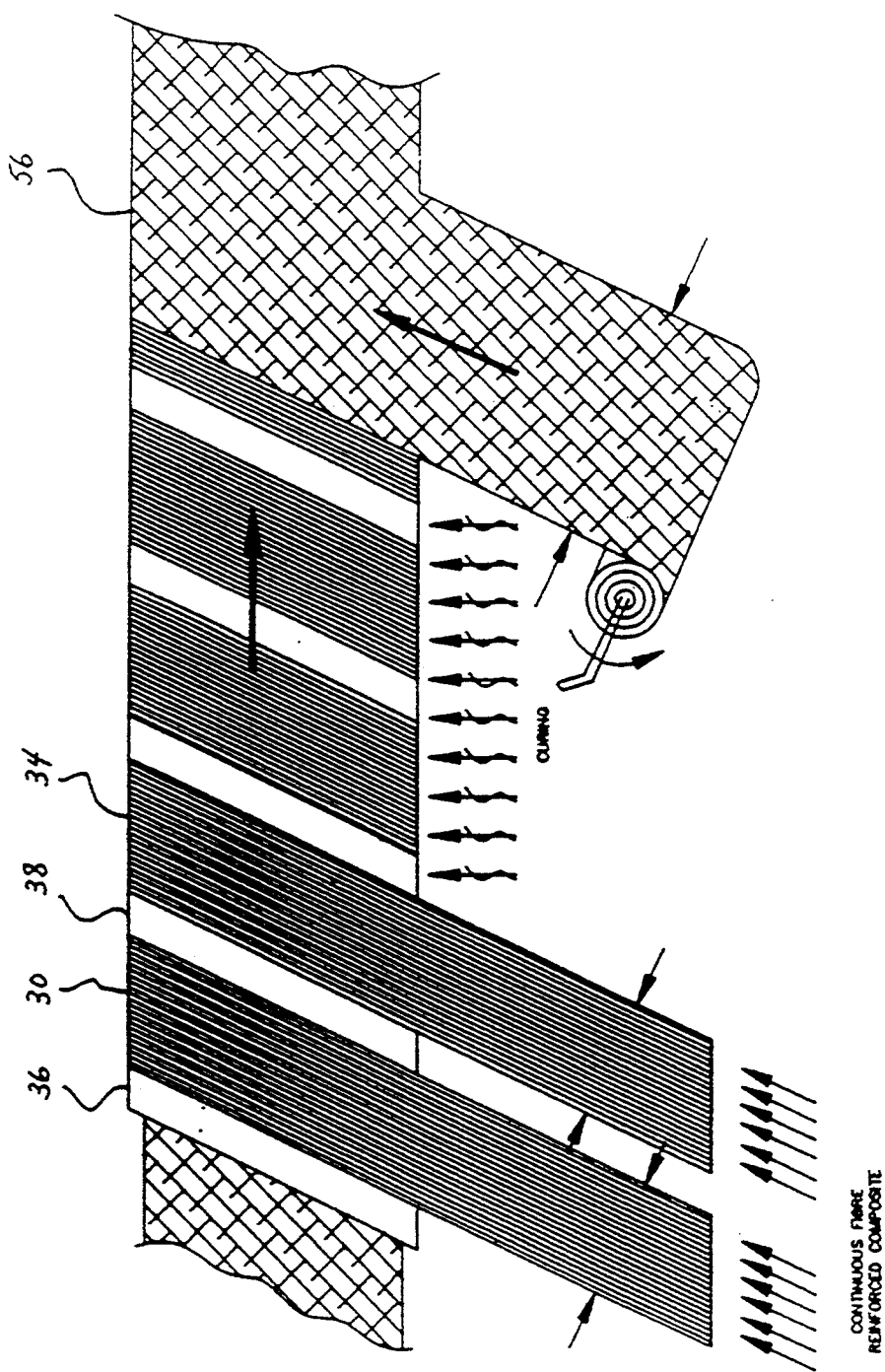

As can be seen from FIG. 9, the elastomeric strips 36,38 are next applied to the outer surface from coils 232, 234 respectively that are mounted on spiders 236, 238. As shown in FIG. 10, the composite strips 30,34 are then wound onto the outer surface between the elastomeric strips 36 and 38 in a manner similar to that of strips 40,42. It will be noted that the recess left by the strip 224 is located between the passes of strips 36,38 and during application of the composite, the film 54 deflects into the recess, allowing the composite similarly to flow into the recess and form the radial projection 32. Again, the composite is effectively moulded "in situ" by virtue of the constraints placed by the strips 36,38 and the configuration of the radially inner wall on which the composite is placed. The composite is then cured and a continuous film 56 applied to the outer surface to complete the inner wall element 14.

Figure 11:
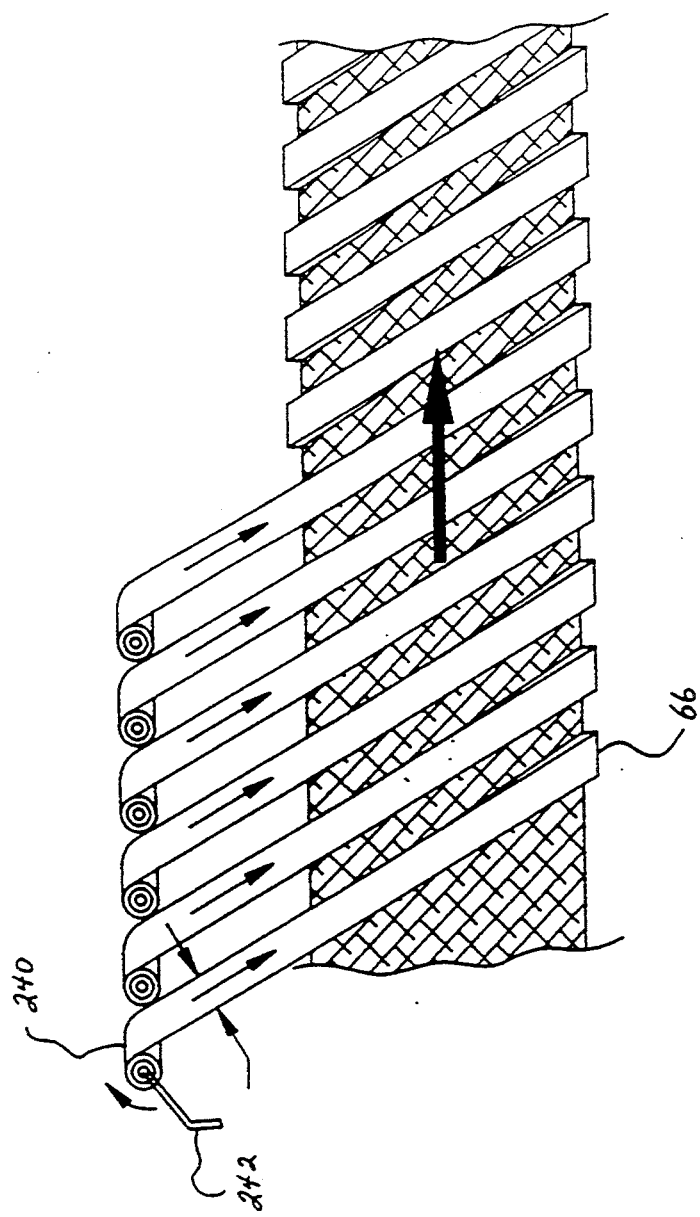
Figure 12:
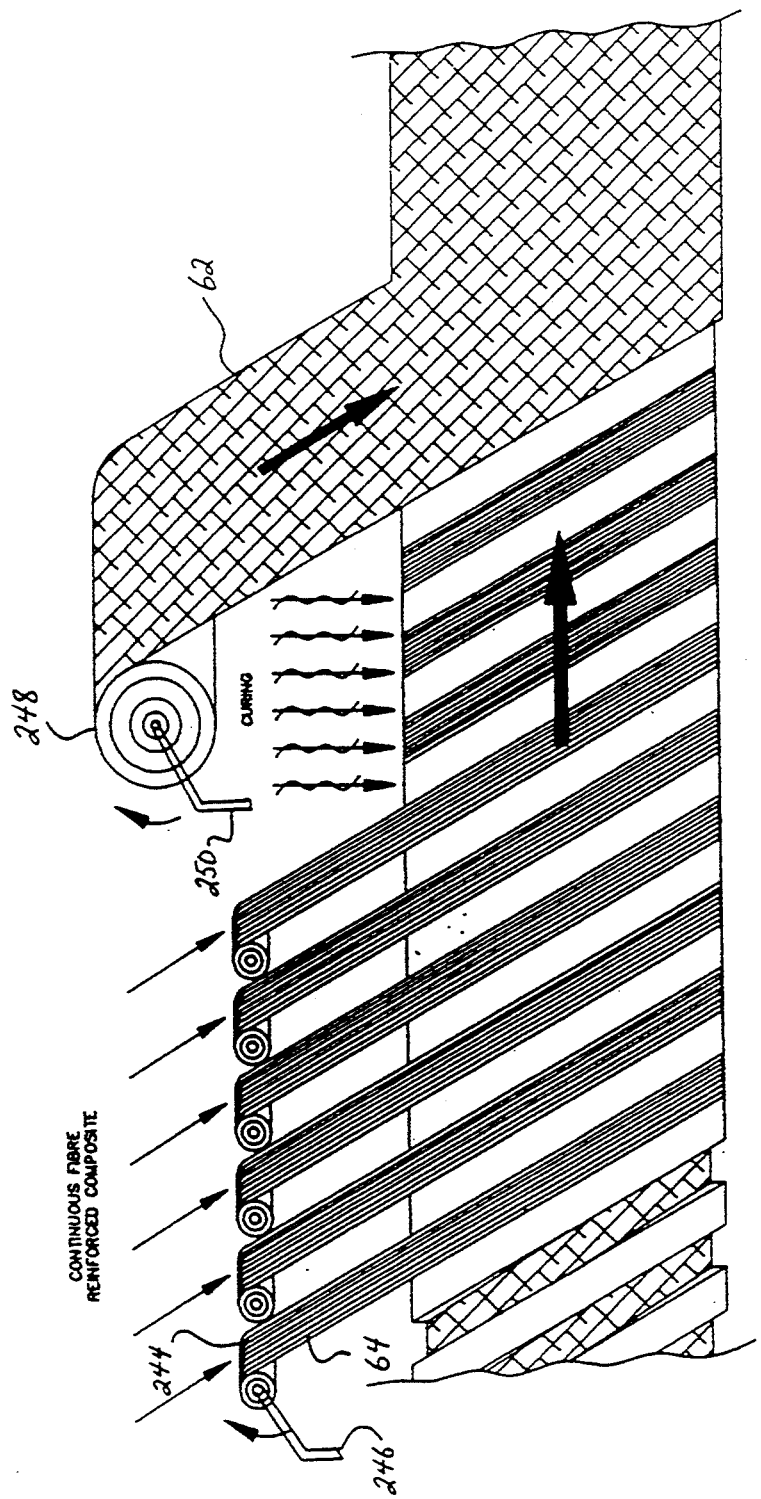

Thereafter, outer wall element 16 is formed, as can be seen in FIG. 11. Elastomeric strips 66 are first applied from respective rolls 240 rotated on spiders 242 to provide a mould for the composite strips 64 which are applied from their respective rolls 244 rotated on spiders 246 (FIG. 12). The composite is cured and film 62 applied from the roll 248 on spider 250. This completes the inner layer 58 of the outer wall element 16.

Figure 13:
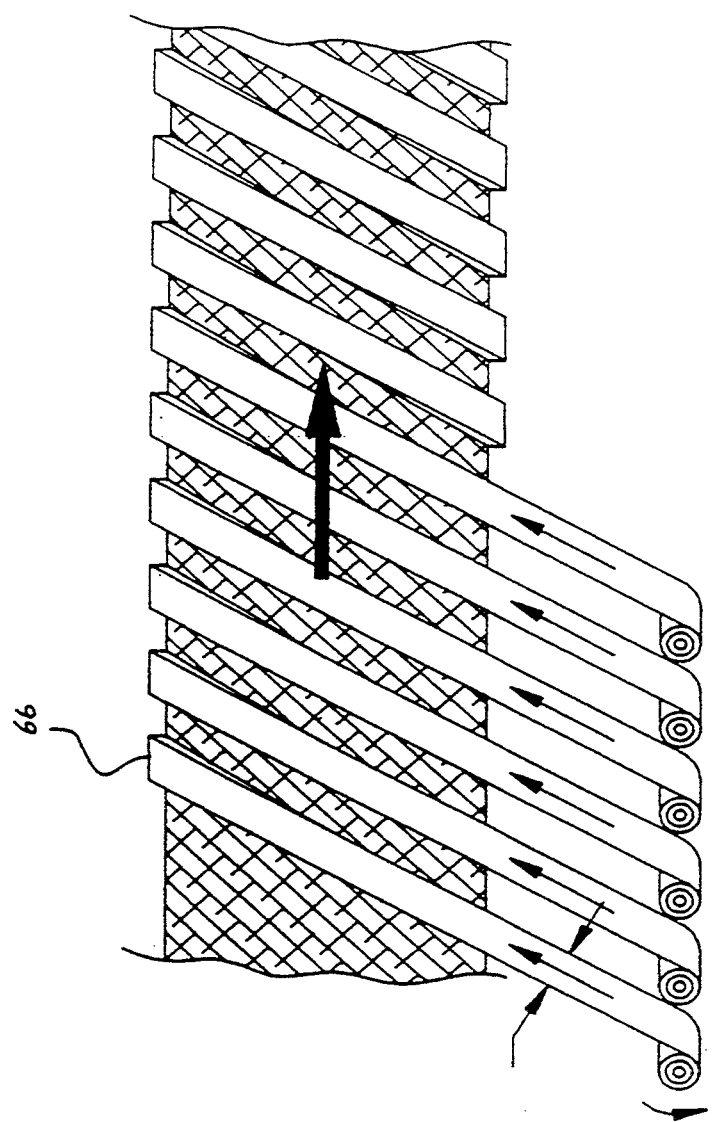
Figure 14:
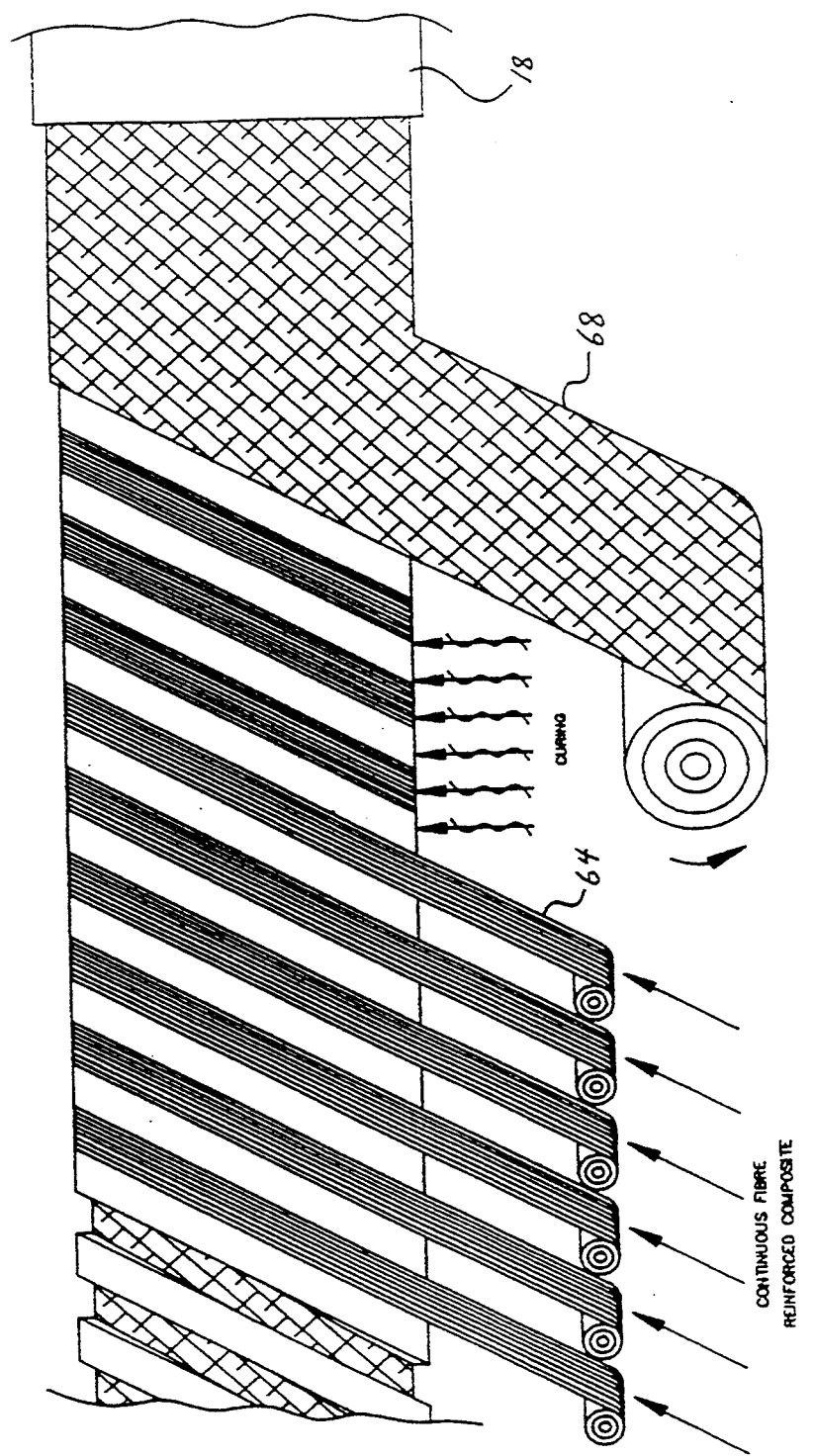

It will be noted that the composite strips 64 of inner layer 58 of outer wall element 16 are applied in opposite hand to the composite strips 30,34,40,42 of inner wall element 14. Subsequently as shown in FIG. 13, the outer layer 60 is formed by application of the elastomeric strips 66 and, as shown in FIG. 14, the composite strips 64 which are subsequently cured. The strips 64,66 of layer 60 are applied in opposite hand to the strips 64,66 of layer 58. Thereafter the film 68 is applied and the outer sheath 18 extruded over the tubular element.

It will be noted that throughout the production process, the elastomeric elements are utilized as a mould for the application of the composite strips so that the composite strips may be applied in a pliable form but when cured provide the requisite spirally wound structure.

It will be appreciated that further layers may be similarly formed utilizing the steps shown above with respect to the embodiment of FIGS. 1 and 2 but in view of the repetitive nature of the process, it is believed that it need not be described further.

Figure 15:
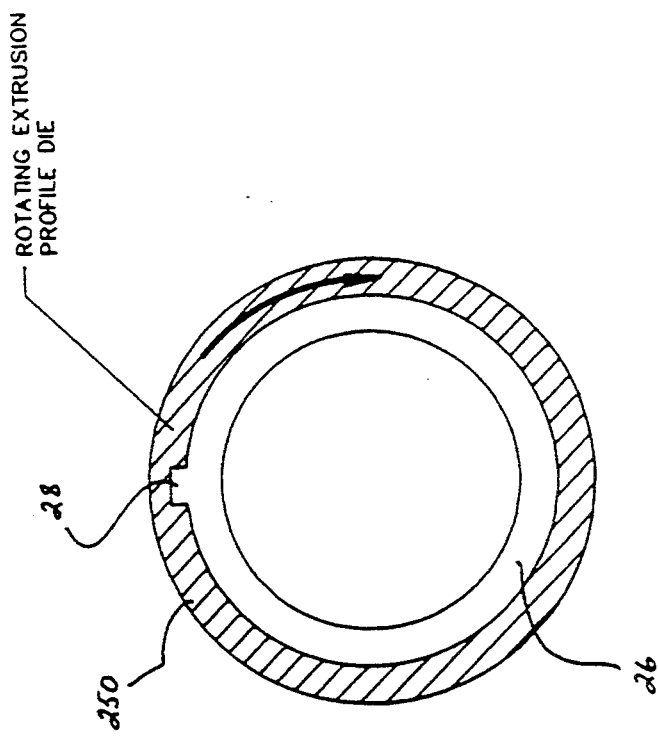
FIG. 15 is a representation of apparatus used as an alternative to the procedure used in FIG. 5.

The preparation of the layer 20 has been described by the bonding or welding of a separate strip to form the projection 28 but it will be appreciated that the same structure may be formed by utilizing a rotating extrusion dye 250 as shown in FIG. 15 in which the projection 28 is simultaneously extruded with the cylindrical wall 26 by rotation of the dye as the wall 26 is axially extruded. This avoids the need to bond or weld a separate strip to the wall 26.

The arrangement described above provides a tubular structure that makes use of continuous fibre reinforced composites and has particularly beneficial structure and/or characteristics. However, a further benefit found from the structure described above with respect to FIGS. 1 through 4 is the ability to make a structurally sound connection between two lengths of tubular structure. Previously this has been extremely difficult with fibre reinforced composite pipes and has not resulted in a structurally satisfactory arrangement.

In order to form a joint between two lengths of the tubular structure 10 shown above or of one length to a fitting, advantage is taken of the nature of the layers that form the structure and in particular the provision of the elastomeric strips within that structure.

Figure 16:
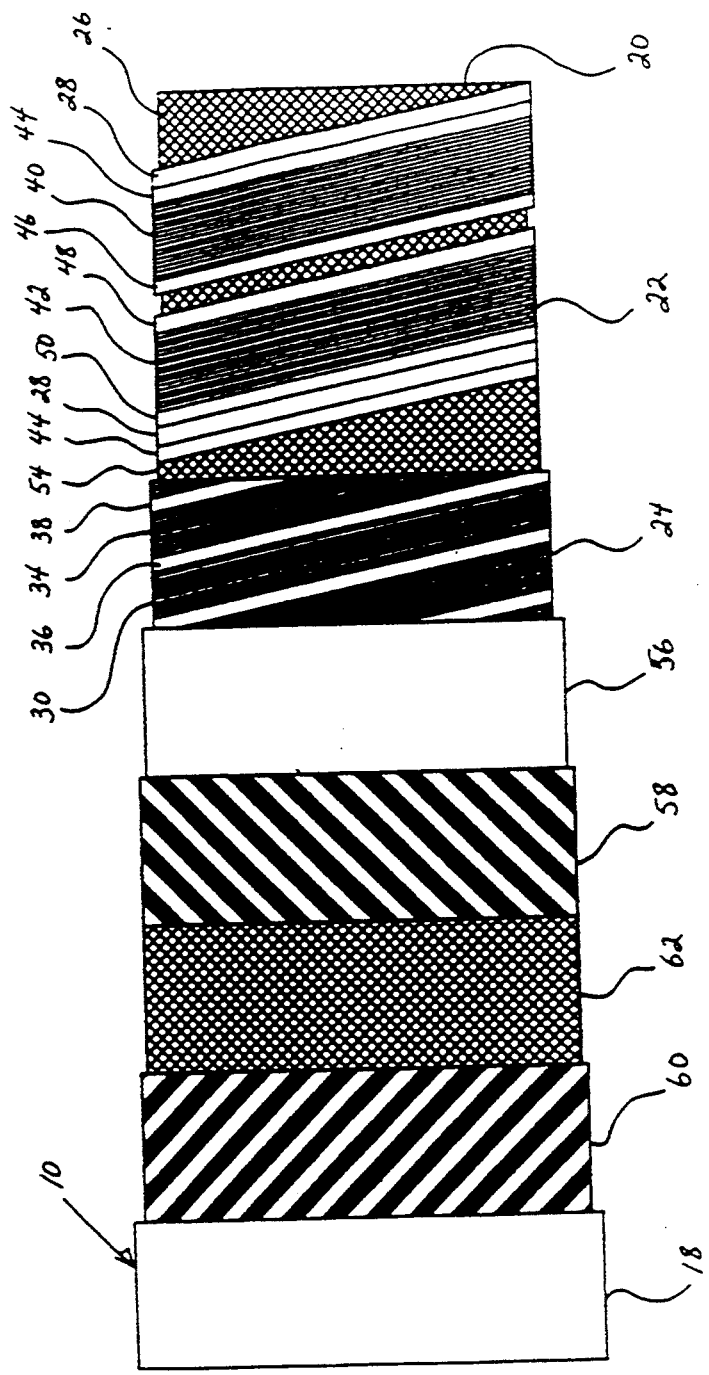
FIGS. 16–23 show schematically successive steps in a procedure for joining two tubular structures similar to that of FIG. 1.

As shown in FIG. 16, the initial step in joining two lengths of the structure 10 is to remove a portion of each layer that increases progressively from the radially inner to the radially outer layer so that a portion of each layer is exposed. The portion exposed will depend upon the composition of the structure and the loads to which it is to be subjected but will typically be three times the diameter of the layer. For convenience the full extent of the exposure of each layer has not been depicted in the figures.

With the individual layers exposed as shown in FIG. 16, a portion of the elastomeric elements in each exposed portion is then removed as indicated by dotted lines. Typically, one-half of the elastomeric strip exposed will be removed so that spiral recesses are formed between the composite strips forming each layer as indicated in FIG. 17.

Figure 17:
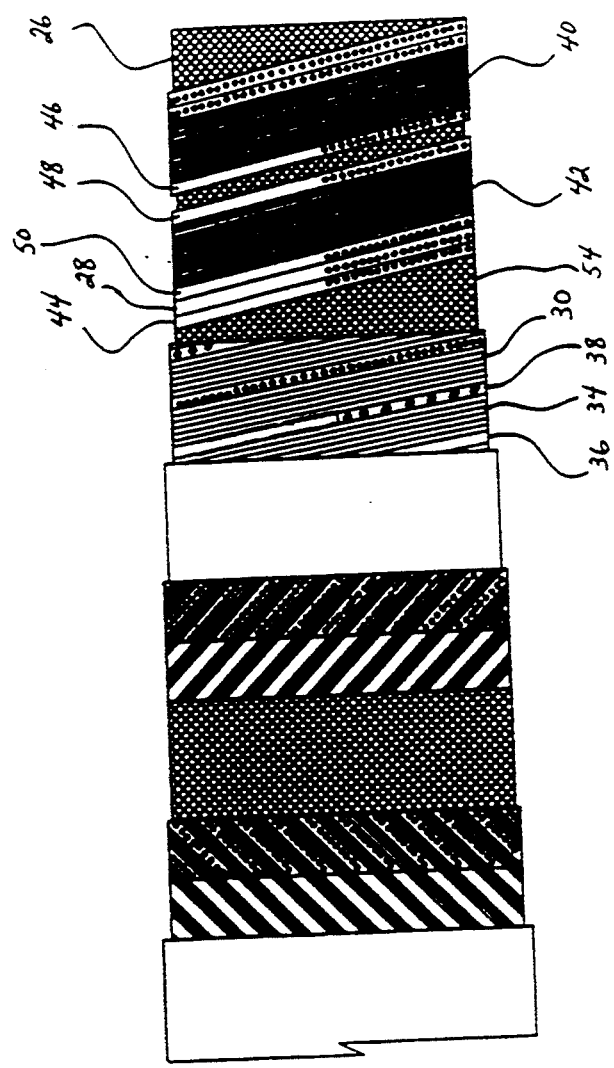
Figure 18:
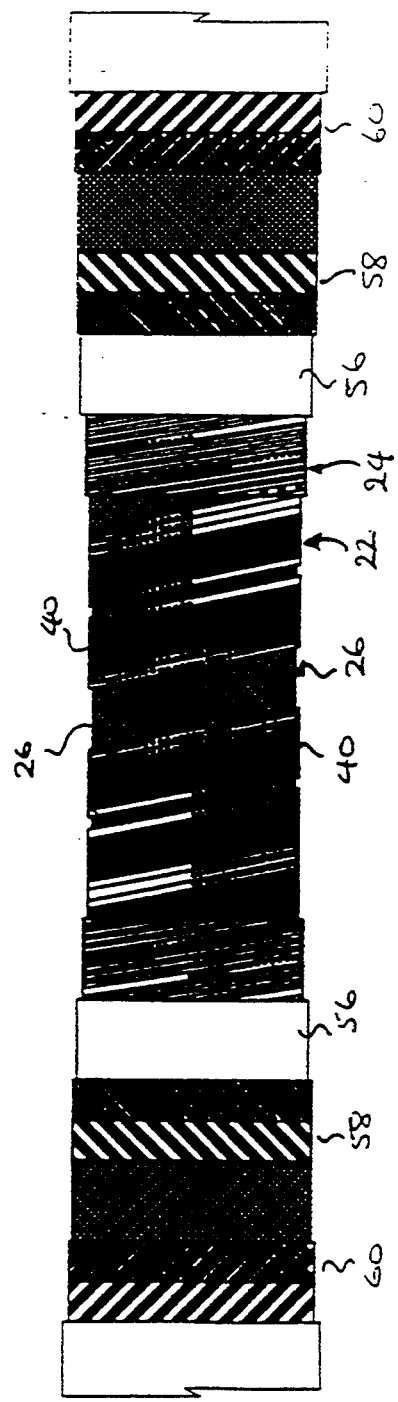

To establish the connection between two tubular structures, a pair of the prepared ends as shown in FIG. 17 are aligned as indicated in FIG. 18 so that the exposed ends of the inner layer 26 abut. The projections 28 will be exposed on the layer 26 and may, if desired, be aligned so as to form a continuous spiral projection from one body to the other. In this position, a thermoplastic welding device is applied to consolidate the abutting liners 26.

Figure 19:
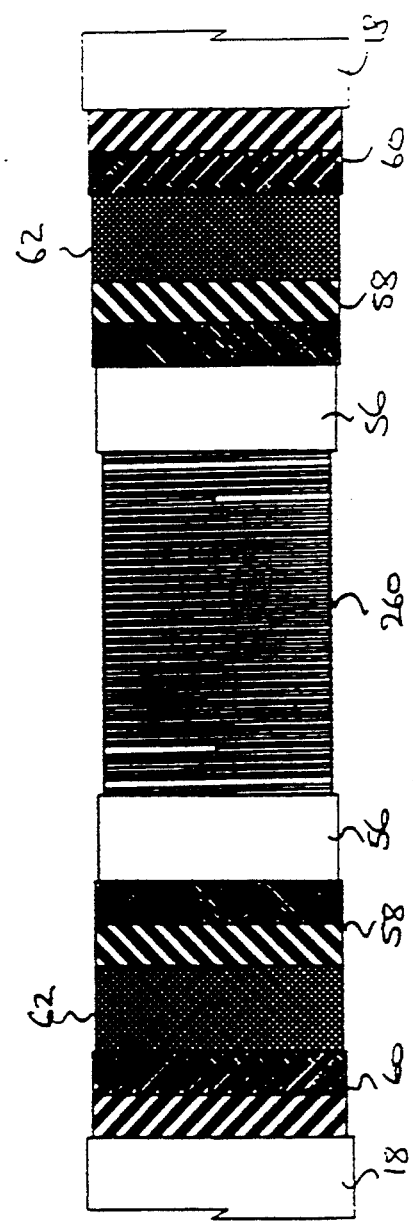
Figure 20:
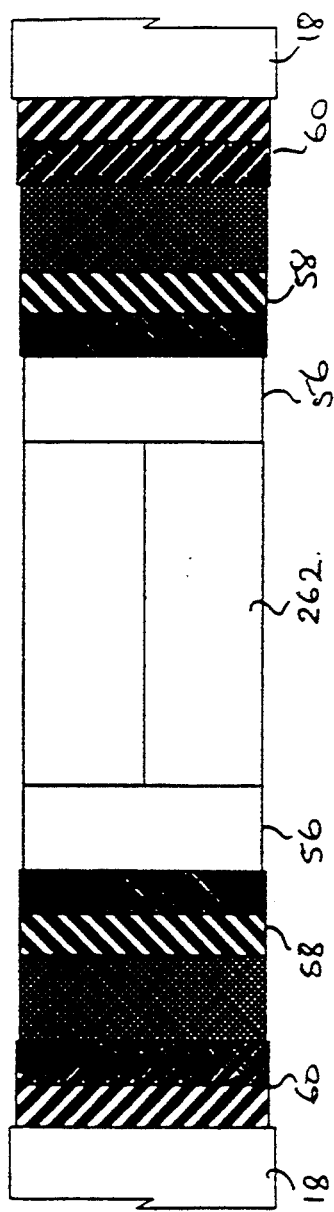
Figure 21:
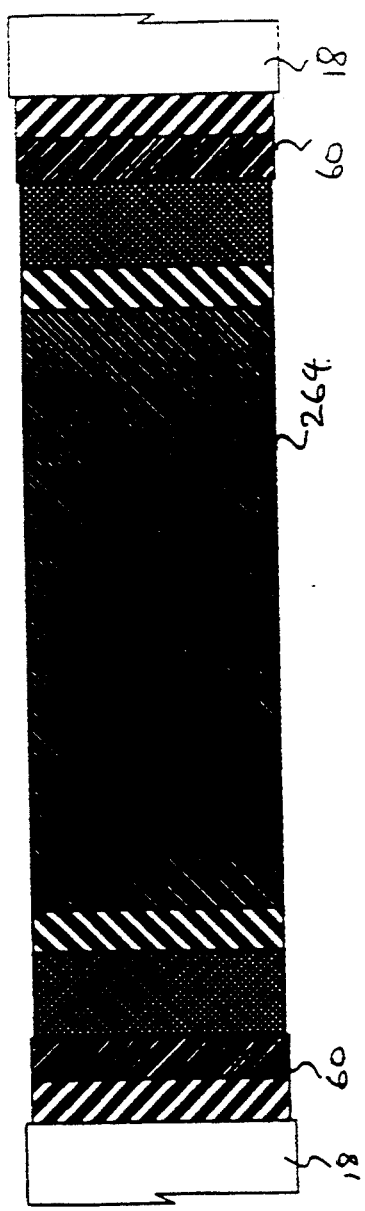
Figure 22:
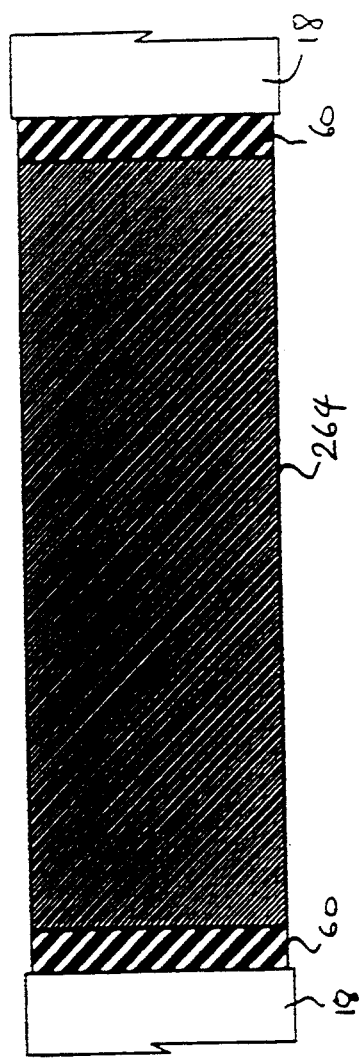
Figure 23:
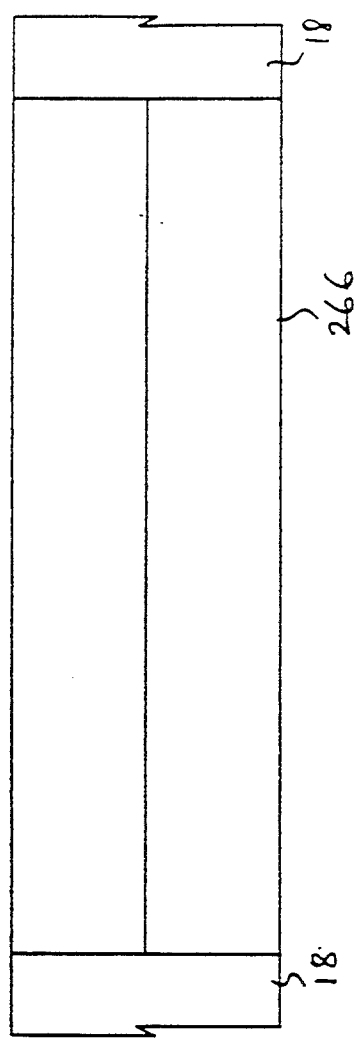

As shown in FIG. 19, a continuous fibre reinforced composite material 260 is then wound about the abutting layers 20, 22 and 24. Several layers of material are wound across the abutting ends 26 and, as then shown in FIG. 20, a plastic film 262 is wrapped about the structure and welded to the film 56. As indicated in FIG. 21, a composite material 264 is then wound about the layers 58 in one hand and (FIG. 22) about the layer 60 in an opposite hand. As shown in FIG. 23, a plastics sleeve 266 is welded to the layer 18 to provide a continuous outer cover. The wound fibres key into the recesses formed by the removal of the elastomer and provide a strong mechanical structure which inhibits relative movement between adjacent composite strips. In this manner, as noted above, a strong structural joint is created with the structural integrity of the components maintained. Obviously the requisite number of layers will be filament wound depending upon the structural makeup of the wall 12, but in each case the removal of the elastomeric elements enables a strong connection to be made.

The procedure described above is of course particularly beneficial when used with the tubular structure of FIGS. 1 to 4. Similar advantages could be obtained when used with a rigid multilayer structure having several helically wound composite strips in at least some of the layers. It would then be necessary to remove selected ones of the strips to provide the spiral recesses to which the composite filaments would be applied. Similarly, connections could be made between the tubular structure and a coupling by providing appropriate layered helical recesses on the coupling to permit winding of the overlying filaments.

We claim:

1. A method of forming a tubular composite structure having a plurality of wall elements, at least one of which includes a layer having a spirally wound strip of composite material, the method comprising the steps of providing as one of said wall elements a cylindrical support element radially inwardly of said layer, applying to said support element a spirally wound former and said composite strip in pliable form with formers on opposite sides of said composite strip to delimit the axial extent thereof, curing said composite strip, and subsequently applying a further wall element radially outwardly of said layer to contain said formers and said composite strip between said wall elements.

2. A method according to claim 1 wherein said formers are elastomeric elements located between successive passes of said strip.

3. A method according to claim 2 further including the step of removing a portion of one of said formers after curing of said strip to provide a helical recess in said layer, applying further helically wound formers to the radially outer surface of said layer and to either side

TABLE I

| | | WALL ELEMENT 14 | | | | | WALL ELEMENT 16 | | | | WALL ELEMENT 18 |
|---|---|---|---|---|---|---|---|---|---|---|---|
| | Inside Diameter (in.) | Layer 20 Radial Thickness (in.) | Layer 22 Radial Thickness (in.) | Layer 24 Radial Thickness (in.) | Helix Angle | Percent Composite | Layer 50 Radial Thickness (in.) | Layer 60 Radial Thickness (in.) | Helix Angle | Percent Composite | Radial Thickness (in.) |
| A* { | 3.0 | 0.200 | 0.007 | 0.007 | 70.0 | 75% | 0.009 | 0.009 | 40.0 | 49% | 0.050 |
| | 3.0 | 0.200 | 0.016 | 0.016 | 70.0 | 75% | 0.021 | 0.021 | 40.0 | 49% | 0.050 |
| | 3.0 | 0.200 | 0.033 | 0.033 | 70.0 | 75% | 0.043 | 0.043 | 40.0 | 49% | 0.050 |
| B* { | 3.0 | 0.200 | 0.008 | 0.008 | 70.0 | 75% | 0.034 | 0.034 | 50.0 | 49% | 0.050 |
| | 3.0 | 0.200 | 0.016 | 0.016 | 70.0 | 75% | 0.021 | 0.021 | 40.0 | 49% | 0.050 |
| | 3.0 | 0.200 | 0.020 | 0.020 | 70.0 | 75% | 0.016 | 0.016 | 30.0 | 49% | 0.050 |
| C* { | 3.0 | 0.200 | 0.014 | 0.014 | 80.0 | 75% | 0.025 | 0.025 | 40.0 | 49% | 0.050 |
| | 3.0 | 0.200 | 0.016 | 0.016 | 70.0 | 75% | 0.021 | 0.021 | 40.0 | 49% | 0.050 |
| | 3.0 | 0.200 | 0.023 | 0.023 | 60.0 | 75% | 0.012 | 0.012 | 40.0 | 49% | 0.050 |
| D* { | 3.0 | 0.200 | 0.016 | 0.016 | 70.0 | 75% | 0.021 | 0.021 | 50.0 | 49% | 0.050 |
| | 3.0 | 0.200 | 0.016 | 0.016 | 70.0 | 75% | 0.021 | 0.021 | 40.0 | 49% | 0.050 |
| | 3.0 | 0.200 | 0.016 | 0.016 | 70.0 | 75% | 0.021 | 0.021 | 30.0 | 49% | 0.050 |
| E* { | 3.0 | 0.200 | 0.016 | 0.016 | 80.0 | 75% | 0.021 | 0.021 | 40.0 | 49% | 0.050 |
| | 3.0 | 0.200 | 0.016 | 0.016 | 70.0 | 75% | 0.021 | 0.021 | 40.0 | 49% | 0.050 |
| | 3.0 | 0.200 | 0.016 | 0.016 | 60.0 | 75% | 0.021 | 0.021 | 40.0 | 49% | 0.050 |

| | Maximum Internal Pressure (Note 1) (psi.) | Maximum External Pressure (Note 1) (psi.) | Maximum Axial Strength (Note 2) (lbs.) | Reading Stiffness 2 (lb. in.) | Bend Radius (Note 3) (ft.) | Axial Strain (Note 4) (%) | Note |
|---|---|---|---|---|---|---|---|
| A* { | 2,000 | 600 | 8,000 | 95,879 | 3.0 | 3.57 | various pressure ratings |
| | 5,000 | 1,600 | 20,000 | 96,581 | 3.0 | 3.57 | same helix angles: 70 & 40 |
| | 10,000 | 3,200 | 41,000 | 98,007 | 3.0 | 3.57 | |
| B* { | 5,000 | 1,600 | 5,000 | 96.581 | 3.0 | 3.57 | one pressure rating: 5,000 psi. |
| | 5,000 | 1,600 | 20,000 | 96,581 | 3.0 | 3.57 | various helix angles: 70 & 30, 40, 50 |
| | 5,000 | 1,600 | 26,000 | 96,637 | 3.0 | 3.57 | impact on wall thickness, axial strength & strain |
| C* { | 5,000 | 1,600 | 20,000 | 96,583 | 3.0 | 3.57 | one pressure rating: 5,000 psi. |
| | 5,000 | 1,600 | 20,000 | 96,581 | 3.0 | 3.57 | various helix angles: 60, 70, 80 & 40 |
| | 5,000 | 1,600 | 11,000 | 96,630 | 3.0 | 3.57 | impact on wall thickness, axial strength & strain |
| D* { | 3,100 | 1,000 | 9,000 | 96,576 | 3.0 | 8.33 | same wall thicknesses |
| | 5,000 | 1,600 | 20,000 | 96,581 | 3.0 | 3.57 | various helix angles: 70 & 30, 40, 50 |
| | 4,000 | 1,300 | 35,000 | 96,586 | 3.0 | 1.59 | impact on performance |
| E* { | 4,200 | 1,300 | 27,000 | 96,576 | 3.0 | 4.32 | same wall thicknesses |
| | 5,000 | 1,600 | 20,000 | 96,581 | 3.0 | 3.57 | various helix angles: 60, 70, 80 & 40 |
| | 3,500 | 1,100 | 14,000 | 96,586 | 3.0 | −1.32 | impact on performance |

| Raw Material Assumptions: | Material Description | Ultimate Tensile Strength (psi.) | Ultimate Compressive Strength (psi.) | Elastic Modulus (psi.) |
|---|---|---|---|---|
| Layers 20, 18 Flexible | Polyethelene | 3,000 | | 36,000 |
| Layers 22, 24, 58, 60 Composite | E" Glass & Polyester | 125,000 | 40,000 | 3,500,000 |
| Layers 22, 24, 58, 60 Elastomer | Neoprene | 1,000 | | 500 |

Notes:
1. At failure
2. At failure with no internal pressure
3. At 50% of ultimate tensile strength (layer 20)
4. At maximum internal pressure of said recess and a composite strip to be located between said formers and in said recess to form a further spirally wound composite strip that overlaps radially with said one strip and is spaced therefrom by elastomeric strips.

4. A method according to claim 3 wherein said further formers are applied prior to application of said composite strip.

5. A method according to claim 1 including the step of forming a radial projection on said support element and locating elastomeric formers on either side of said projection.

6. A method according to claim 5 including the step of locating an elastomeric former on said support element between said projections.

7. A method according to claim 6 including the step of locating a composite strip between adjacent pairs of said formers.

8. A method according to claim 7 wherein said formers are applied prior to said composite strips.

9. A method according to claim 7 including the step of removing a portion of said former located between said projections subsequent to curing of said strip to define a radially inwardly directed helical recess.

10. A method according to claim 9 including the step of applying a further composite strip radially outwardly of said layer and into said recess.

11. A method according to claim 10 including the step of delimiting said further composite strip by application of helically wound formers to the radially outer surface of said layer.

12. A method according to claim 11 wherein said formers are applied prior to application of said composite strip.

13. A method according to claim 11 including the step of applying a film to the radially outer surface of said layer prior to application of said strip and formers.

14. A method according to claim 11 including the step of helically winding a further layer comprising an elastomeric element and a composite strip radially outwardly of said further composite strip.

15. A method according to claim 14 wherein an additional helical winding of composite strip and elastomer is provided radially outwardly of said further layer.

16. (new) A method according to claim 15 wherein said additional helical winding is of opposite hand to said further layer.

17. A method according to claim 16 wherein a film is located between said further layer and said additional winding to facilitate relative movement therebetween.

18. A method according to claim 14 wherein a film is provided between said further layer and said further composite strip to facilitate relative movement therebetween.

19. A method according to claim 1 wherein said formers are applied prior to application of said composite strip.

* * * * *